(12) United States Patent
Someya et al.

(10) Patent No.: US 11,909,348 B2
(45) Date of Patent: Feb. 20, 2024

(54) CONTROL DEVICE FOR STEPPING MOTOR

(71) Applicant: ORIENTAL MOTOR CO., LTD., Tokyo (JP)

(72) Inventors: Masayuki Someya, Tsukuba (JP); Akihiko Houda, Tsukuba (JP)

(73) Assignee: ORIENTAL MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/914,049

(22) PCT Filed: Mar. 2, 2021

(86) PCT No.: PCT/JP2021/007999
§ 371 (c)(1),
(2) Date: Sep. 23, 2022

(87) PCT Pub. No.: WO2021/199856
PCT Pub. Date: Oct. 7, 2021

(65) Prior Publication Data
US 2023/0131824 A1 Apr. 27, 2023

(30) Foreign Application Priority Data
Mar. 30, 2020 (JP) ................. 2020-060887

(51) Int. Cl.
*H02P 8/12* (2006.01)
*H02K 37/00* (2006.01)
(Continued)

(52) U.S. Cl.
CPC ............. *H02P 8/12* (2013.01); *H02K 37/00* (2013.01); *H02P 8/14* (2013.01); *H02P 8/22* (2013.01)

(58) Field of Classification Search
CPC ..... H02P 8/12; H02P 8/14; H02P 8/22; H02K 37/00
(Continued)

(56) References Cited

U.S. PATENT DOCUMENTS 4,683,408 A * 7/1987 Inoue .................. H02P 8/12
318/696
5,844,394 A * 12/1998 Mushika ............. H02P 8/22
358/421
(Continued)

FOREIGN PATENT DOCUMENTS

| JP | H07-59395 A | 3/1995 |
| JP | H11-113289 A | 4/1999 |

(Continued)

*Primary Examiner* — David Luo
(74) *Attorney, Agent, or Firm* — Rabin & Berdo, P.C.

(57) ABSTRACT

A stepping motor control device is provided, which controls a stepping motor including a rotor position detector by micro-step driving. The control device has a plurality of operation modes including an adjustment mode and a use mode. In the adjustment mode, the control device generates control data for a closed loop control for controlling the winding current of the stepping motor based on the detection value of the rotor position detector, and performs a stepping motor acceleration operation and a stepping motor deceleration operation according to the control data. In the use mode, the control device performs the stepping motor acceleration operation and the stepping motor deceleration operation so that a winding current observed in the adjustment mode is reproduced by an open loop control for controlling the winding current of the stepping motor based on the control data generated in the adjustment mode.

14 Claims, 14 Drawing Sheets

(51) Int. Cl.
*H02P 8/14* (2006.01)
*H02P 8/22* (2006.01)

(58) Field of Classification Search
USPC .................................. 318/696, 685, 671, 560
See application file for complete search history.

(56) References Cited

U.S. PATENT DOCUMENTS

| | | | | |
|---|---|---|---|---|
| 6,555,985 | B1 * | 4/2003 | Kawabata | .................. H02P 8/38 |
| | | | | 318/434 |
| 2008/0272730 | A1 | 11/2008 | Hoda | |
| 2014/0368676 | A1 | 12/2014 | Yoshimuta | |

FOREIGN PATENT DOCUMENTS

| | | |
|---|---|---|
| JP | 2005-117762 A | 4/2005 |
| JP | 2007-318947 A | 12/2007 |
| JP | 4195897 B2 | 12/2008 |
| JP | 4250051 B2 | 4/2009 |
| JP | 2012-175730 A | 9/2012 |
| JP | 2015002609 A | 1/2015 |
| JP | 2018-196206 A | 12/2018 |

* cited by examiner

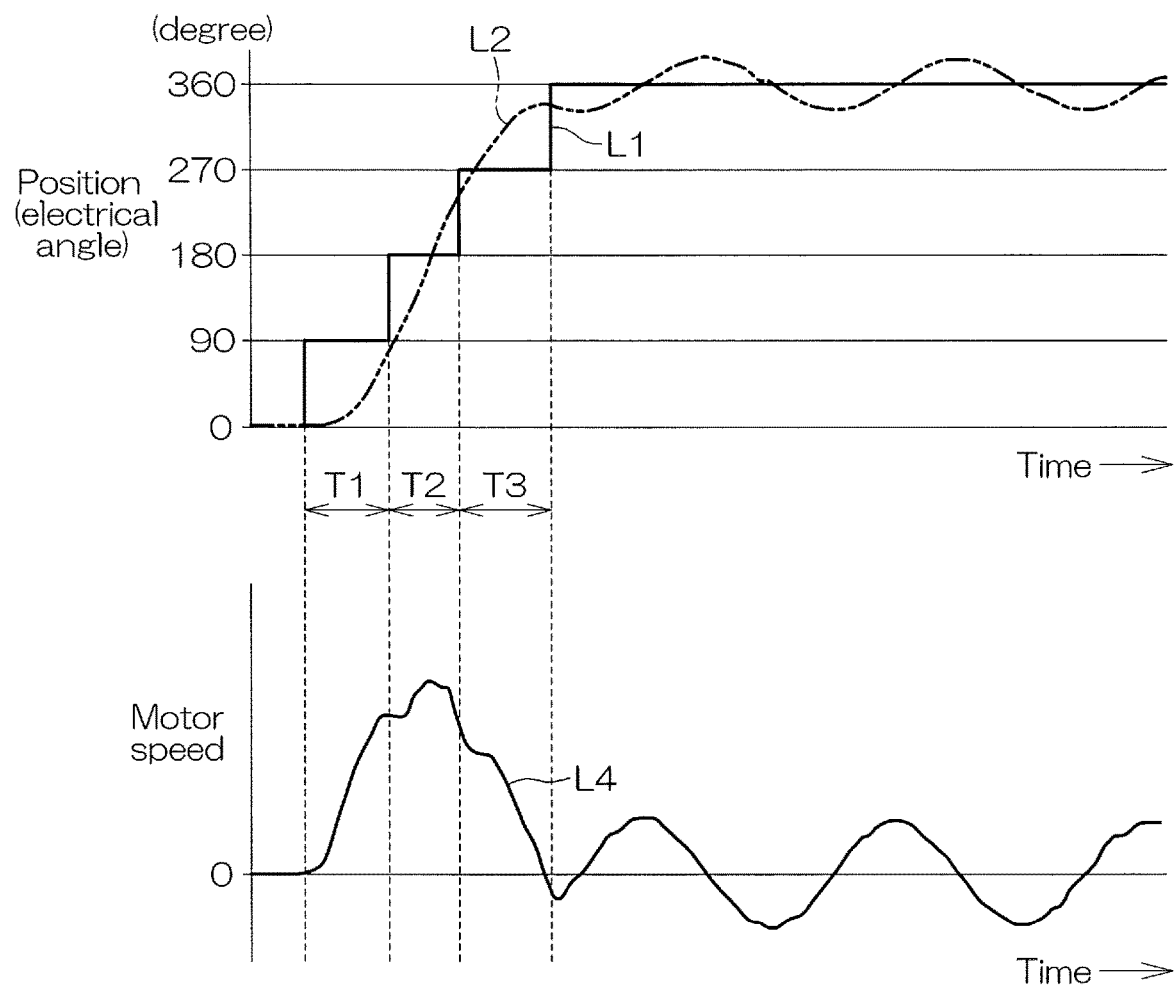

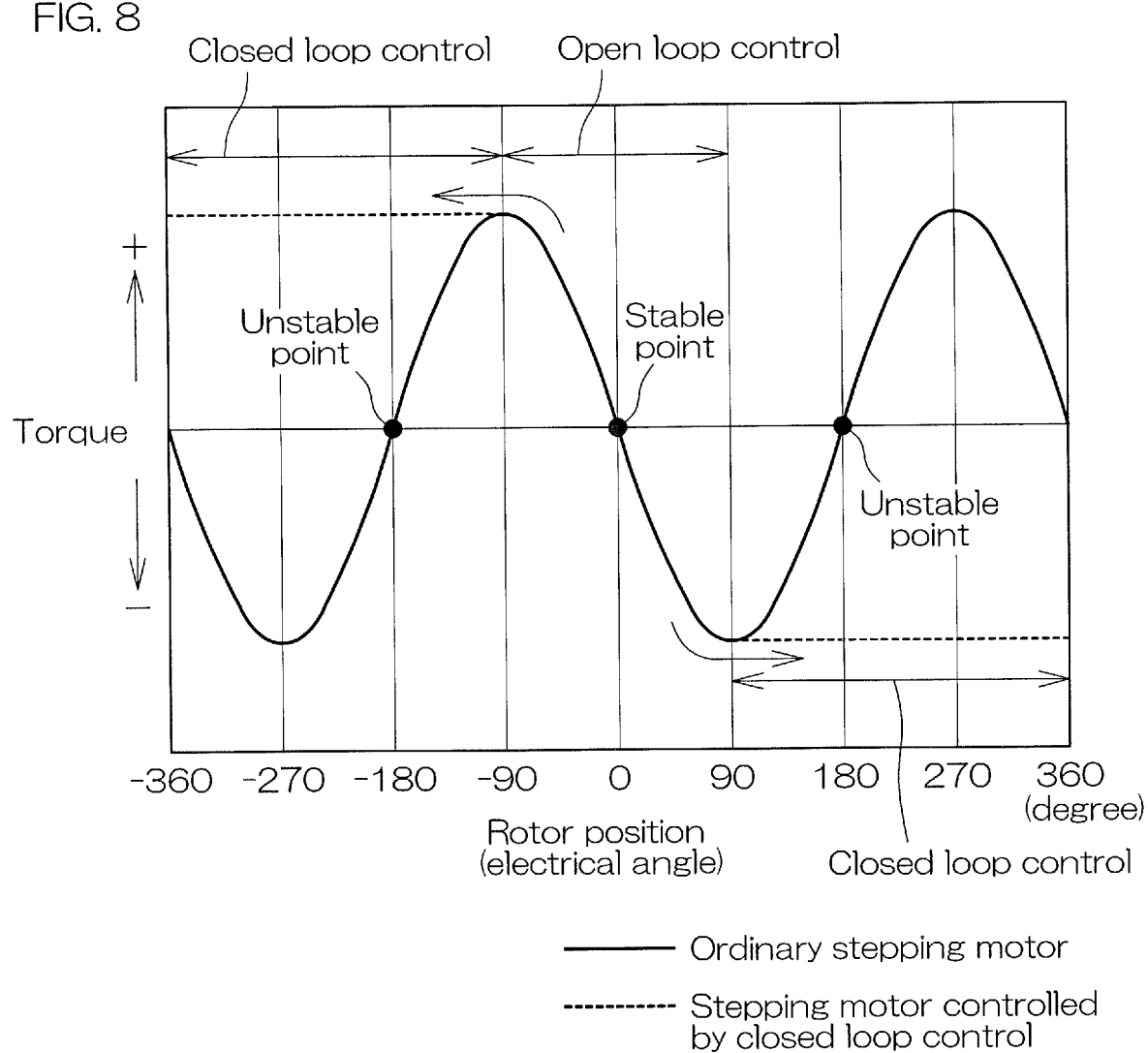

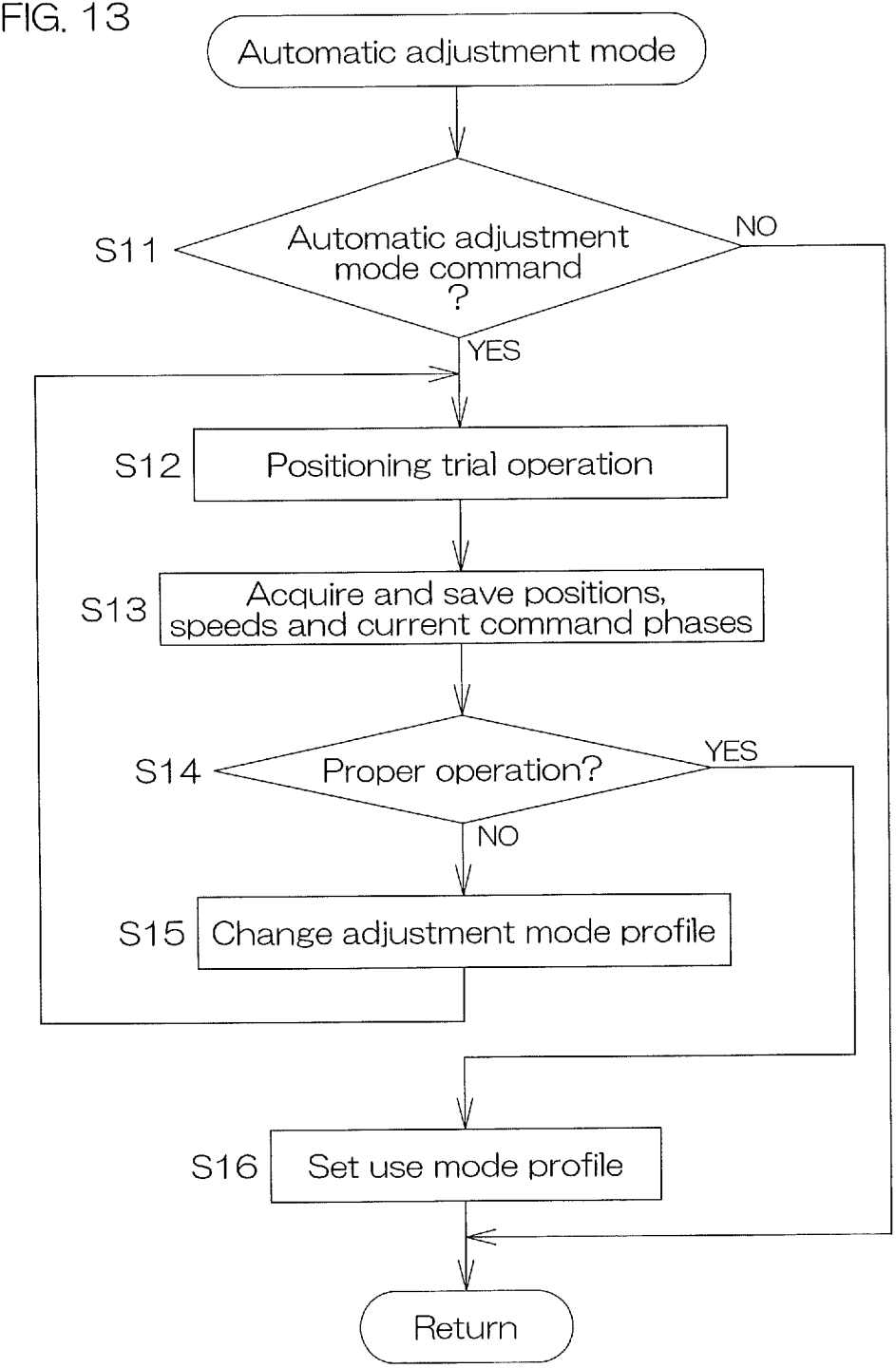

CONTROL DEVICE FOR STEPPING MOTOR

TECHNICAL FIELD

The present invention relates to a device for controlling a stepping motor.

BACKGROUND ART

The stepping motor is generally configured to rotate a predetermined angle every time when its excitation phase is switched over. The rotation angle and the rotation speed of the stepping motor can be accurately controlled. In particular, the steeping motor is used as a drive source for a device which requires precise movement and positioning. Known stepping motor driving methods include a full-step driving method and a micro-step driving method. The full-step driving method is such that the excitation phase is switched over in response to an input pulse to rotate the rotor by a basic step angle specified by the internal structure of the stepping motor. The micro-step driving is such that the excitation phase is not completely switched over but winding current distribution is finely divided to rotate the rotor by a fine angle (micro-step angle) which is smaller than the basic step angle.

An exemplary use application of the stepping motor is for a chip component inspection device and a taping device. In these devices, the stepping motor is used as a drive source for feeding a carrier tape on which a plurality of chip components are held at a predetermined pitch. For example, chip components each having an approximate size of 0.4 mm×0.2 mm are supported at a pitch of several millimeters on a carrier tape. In such a use application, the stepping motor is repeatedly driven by a fine angle of several degrees for a very short period of several milliseconds. In this case, the capabilities of the devices are determined directly by how quickly and precisely the minute chip components can be moved and positioned. Therefore, the stepping motor is required to have a positioning capability such as to reach a target position in the shortest possible period of time through acceleration and deceleration by utilizing the maximum torque of the stepping motor, and to minimize oscillation after the target position is reached.

PTL 1 discloses a control device for the micro-step driving of the stepping motor. The control device employs a control system which is capable of rotating the stepping motor with the maximum torque without stepping-out even if the stepping motor fails to conform to a command. The control system is capable of suppressing the expansion of the speed deviation of the stepping motor to achieve a stable positioning operation with minimum oscillation. However, the control system of PTL 1 is not intended to repeatedly perform the positioning operation by moving the stepping motor by a fine angle of several degrees for a short period of several milliseconds nor to suppress the oscillation after the target position is reached.

PTL 2 discloses a stepping motor driving device for performing the moving and positioning operation based on four pulses for each electrical angle cycle (corresponding to four steps) by the full-step driving. Specifically, an attempt is made to determine the switch timing of each phase excitation (i.e., time interval) based on the mathematical model of the stepping motor to perform a driving operation so as to reach the target position in a shorter period of time and prevent the oscillation.

PTL 3 discloses a driving system which limits the full-step driving movement to one half of the electrical angle cycle, i.e., two pulses (two steps). Further, so-called current-up and current-down functions are used in combination by increasing the current during operation and reducing the current during stopping. Thus, the movement period is reduced.

PTL 4 is intended to achieve the quickest movement and positioning through the closed loop control of the micro-step driving by utilizing the maximum torque of the motor in the acceleration and the deceleration.

Specifically, the acceleration and the deceleration with the maximum torque are achieved through the closed loop control by feeding back the detection value of a rotor sensor which detects the position of a rotor. By adjusting an acceleration period and a deceleration period, the speed is controlled to zero at a target stop position. When the speed is reduced to zero after the deceleration period, a position command for the target position is applied to maintain the rotor position.

CITATION LIST

Patent Literature

PTL 1: JP4195897
PTL 2: JP2012-175730A
PTL 3: JP2018-196206A
PTL 4: JP4250051

SUMMARY OF INVENTION

Problem to be Solved by Invention

In the art of PTL 2, it is necessary to identify a plurality of parameters step by step during measurement as shown in FIG. 4 of PTL 2. For simultaneous identification of the plurality of parameters, it is necessary to searchingly determine a parameter consistent to an actual response while comparing the actual response with numerical simulation. Through the step of identifying the plurality of parameters, the response of the motor is simulated by numerical computation. However, physical phenomena cannot be fully modeled. Therefore, the resulting simulation model is not completely consistent to the actual response, making it impossible to determine an optimum excitation switching timing based on the simulation model.

Consequently, it is necessary to repeatedly adjust a plurality of excitation switching timings, i.e., a plurality of time intervals, to searchingly determine a combination of time intervals which minimizes the oscillation. In addition, there is no guarantee that the best results are obtained, making it necessary to try various initial values. This requires substantially the same work amount as required for adjusting the time intervals by measuring the motor responses without the use of the simulation model.

Further, the full-step driving employed in PTL 2 has a lower motor torque utilization efficiency, and is not suitable for the use application requiring the quickest movement and positioning. For the quickest movement, the acceleration and the deceleration should be achieved with the maximum torque that can be generated by the motor. However, the torque generated during the rotation by the full-step driving is liable to fluctuate as expressed by the sine function of the rotor rotation angle, making it impossible to maintain the operation with the maximum torque. In addition, the full-step driving problematically requires a complicated movement model, so that the adjustment is difficult.

Thus, the art of PTL 2 is problematic in that the quickest movement and positioning are impossible and the adjustment is difficult, requiring labor and time.

In PTL 3, the torque is fluctuated during the acceleration period and the deceleration period, and only half the available torque is utilized, as shown in FIG. 9 of PTL 3 (in FIG. 9 of PTL 3, the abscissa is shown on a wrong scale, and the displacement amount corresponding to the waveform of a torque F is equivalent to two steps of a motor having a basic step angle of 1.8 degrees and, therefore, is not 1.8 degrees but 3.6 degrees). Similarly to PTL 2, the full-step driving is basically employed, so that the quickest movement and positioning cannot be achieved. Further, the flexibility of the movement is problematically reduced because of the full-step driving. In the method of PTL 3, the acceleration torque and the deceleration torque are each generated in a constant current state without switching the current, and the magnitude and the direction of the generated torque vary according to a change in the displacement angle of the motor. In this method, however, the acceleration and the deceleration cannot be individually adjusted but are based on an isosceles triangle drive pattern in which the inclinations of the acceleration and the deceleration are equal to each other. In addition, the deceleration is liable to be enhanced by a frictional load or the like, so that the target position cannot be reached to result in adjustment failure.

PTL 3 states that it is difficult to adjust the pulse input timing in the prior art mentioned therein. However, the art of PTL 3 also definitely needs the timing adjustment. In the art of PTL 3, the movement amount corresponds to two pulses of the basic step angle, and is smaller than that corresponding to four pulses in the art of PTL 2. Therefore, the timing adjustment may be simplified. In PTL 3, however, there is no specific description about how to suppress the oscillation at the target position. For the suppression of the oscillation, it is necessary to adjust at least the current switching timing of the second pulse.

The arts of PTL 2 and PTL 3 for the adjustment of pulse intervals may be applicable to the adjustment of several pulses for the full-step driving, but it is very difficult to apply the arts of PTL 2 and PTL 3 to the micro-step driving by which the stepping motor is driven with numerous pulses. Further, it is difficult to generate a proper current waveform.

The art of PTL 4 can achieve the quickest movement and positioning by very simple adjustment, but has the following two problems.

First, a very-high-precision detector is required for the detection of the rotor position. In a use application such as for an inspection device for inspecting chip components each having a chip size of 1 mm or less, for example, the stepping motor is required to have a very high positioning accuracy. The stopping accuracy of a commercially available hybrid stepping motor assembled with a high accuracy is not higher than ±1 arc minute (=1/21600 turn). The chip component inspection device is also required to have substantially the same level of motor positioning accuracy as the stopping accuracy. Correspondingly, the rotor position detector to be used for the control of the stepping motor is also required to have comparable or higher resolution and accuracy. If the accuracy of the rotor position detector is low, the torque is liable to fluctuate during the closed loop operation, so that the response varies. This results in the oscillation at the stop position. However, the rotor position detector with a higher resolution and a higher accuracy tends to be expensive and have a larger size. In addition, special consideration is required for assembling the rotor position detector to ensure the highly accurate detection, leading to increased system costs. Further, the larger position detector occupies a larger space. In addition, the load inertia is liable to increase, thereby increasing the positioning time.

Secondly, there is a problem with the stability against an external disturbance. In the method for precisely adjusting the maximum torque acceleration period and the maximum torque deceleration period to control the speed to zero precisely at the target position, there is no means for suppressing the fluctuations due to the external disturbance. That is, even if the lag or the lead of the rotor position occurs due to the external disturbance factor during the rotation, the torque is constant. For example, a mechanical frictional load and a viscous load are also liable to fluctuate during the use of the device. In a strict sense, the motor torque is liable to be slightly changed due to the ambient temperature. The slight fluctuations in the loads and the fluctuations in the torque may cause deviation in the adjustment, resulting in oscillation at the stop.

The art of PTL 4 can thus achieve the quickest movement and positioning, but needs a high precision rotor position detector. Further, the system of PTL 4 is fragile against the external disturbance.

An embodiment of the present invention provides a stepping motor control device, which is easily adjustable and is capable of effectively utilizing a generated torque to move a rotor without the need for the high precision rotor position detector.

Another embodiment of the present invention provides a stepping motor control device, which is easily adjustable, and is capable of effectively utilizing a generated torque to move a rotor with higher robustness against the external disturbance.

Solution to Problem

According to one embodiment of the present invention, there is provided a stepping motor control device which controls a stepping motor including a rotor position detector by micro-step driving. The control device has a plurality of operation modes including an adjustment mode and a use mode. In the adjustment mode, the control device generates control data for a closed loop control for controlling the winding current of the stepping motor based on the detection value of the rotor position detector, and performs a stepping motor acceleration operation and a stepping motor deceleration operation according to the control data. In the use mode, the control device performs the stepping motor acceleration operation and the stepping motor deceleration operation so that a winding current observed in the adjustment mode is reproduced by an open loop control for controlling the winding current of the stepping motor based on the control data generated in the adjustment mode.

With this arrangement, the control device controls the stepping motor by the micro-step driving, so that the acceleration operation and the deceleration operation can be performed by constantly using substantially the maximum torque (the maximum torque or a torque close to the maximum torque). Thus, the control device has a higher torque utilization efficiency.

In the adjustment mode and the use mode, the control device operates the stepping motor by the micro-step driving. In the adjustment mode, the winding current of the stepping motor is controlled by the closed loop control using the detection value of the rotor position detector. At this time, the control data for the acceleration operation and the deceleration operation by the micro-step driving is generated, and the acceleration operation and the deceleration operation are performed according to the control data. In the use mode, the acceleration operation and the deceleration operation are performed by the micro-step driving through the open loop control based on the control data generated in the adjustment mode. Thus, the winding current observed in the adjustment mode can be reproduced, so that the acceleration operation and the deceleration operation can be performed in substantially the same manner as in the adjustment mode.

In the adjustment mode, the acceleration operation and the deceleration operation can be properly performed by adjusting an operation parameter. Control data generated when the acceleration operation and the deceleration operation can be properly performed is saved. By using the control data in the use mode, the proper acceleration operation and the proper deceleration operation can be achieved.

In the use mode, the open loop control is employed to obviate the need for using the detection value of the rotor position detector, so that the stepping motor can be controlled without any influence of the detection accuracy of the rotor position detector. In the closed loop control performed in the adjustment mode, the detection value of the rotor position detector is used and, therefore, the torque is liable to fluctuate due to the detection accuracy of the rotor position detector to cause variations in the response of the stepping motor. This may result, for example, in oscillation at a stop position. However, control data generated when such behaviors are observed is discarded, but is not used in the use mode. That is, control data generated when a proper stepping motor response is obtained is saved in the adjustment mode, so that the proper response can be reproduced by using the control data in the use mode. Therefore, the rotor position detector is simply required to have a detection accuracy and a stability (detection reproducibility) that can provide the proper response at least once in a plurality of trial operations in the adjustment mode.

In PTL 4, a very-high-precision detector is required for the detection of the rotor position, because a closed loop area is employed for the operation in actual use. Therefore, PTL 4 has the first problem described above. This embodiment provides a solution to the first problem.

In one embodiment of the present invention, the control data is generated, in the closed loop control in the adjustment mode, so that the winding current phase $\theta i$ of the stepping motor is equal to a phase $\theta i = \theta fb \pm K + F(\omega fb)$ obtained by adding a predetermined value $\pm K$ (wherein K is a constant, and has a positive sign for one of the acceleration operation and the deceleration operation and has a negative sign for the other of the acceleration operation and the deceleration operation) and the function $F(\omega fb)$ of a rotor speed $\omega fb$ to the detection value $\theta fb$ of the rotor position detector.

Where the winding current phase is obtained by adding the predetermined value $\pm K$ to the detection value $\theta fb$ of the rotor position detector, the winding current phase is shifted by the predetermined value K with respect to the rotor and, therefore, the torque can be generated according to the phase shift. Further, control data subjected to speed compensation can be generated with the use of the winding current phase obtained by the addition of the function $F(\omega fb)$ of the rotor speed $\omega fb$. This makes it possible to generate the control data ensuring the generation of the torque according to the predetermined value $\pm K$ and subjected to the speed compensation. Therefore, a proper response can be easily obtained in the adjustment mode, and the proper response thus obtained can be reproduced in the use mode.

In the expression $\omega i = \theta fb \pm K + F(\omega fb)$) representing the motor winding current phase $\theta i$, the sign of the second term is set positive when the torque is applied to the rotor in one of opposite directions (e.g., a forward rotation direction), and is set negative when the torque is applied to the rotor in the other direction (e.g., a reverse rotation direction). Specifically, where the rotor is rotated in the forward rotation direction, the control data for the acceleration operation is generated so that the winding current phase $\theta i$ is equal to $\theta i = \theta fb + K + F(\omega fb)$, and the control data for the deceleration operation is generated so that the winding current phase $\theta i$ is equal to $\theta i = \theta fb - K + F(\omega fb)$. Where the rotor is rotated in the reverse rotation direction, in contrast, the control data for the acceleration operation is generated so that the winding current phase $\theta i$ is equal to $\theta i = \theta fb - K + F(\omega fb)$, and the control data for the deceleration operation is generated so that the winding current phase $\theta i$ is equal to $\theta i = \theta fb + K + F(\omega fb)$. Thus, the direction of the torque to be generated is reversed by reversing the sign of the predetermined value $\pm K$.

If the rotor speed is low, the function $F(\omega fb)$ for the speed compensation may be obviated to provide $\theta i = \theta fb \pm K$.

In one embodiment of the present invention, the absolute value of the predetermined value $\pm K$ is a value corresponding to an electrical angle of less than 90 degrees.

Even with the absolute value of the predetermined value $\pm K$ set as corresponding to an electrical angle of 90 degrees, the acceleration and the deceleration with the maximum torque can be achieved. If the absolute value of the predetermined value $\pm K$ is set as corresponding to an electrical angle of 90 degrees in the adjustment mode, however, it is impossible to suppress the fluctuations (i.e., the lag or the lead) of the rotor position occurring due to an external disturbance factor during the rotation in the use mode. Therefore, the lag and the lead of the rotor position is liable to be expanded, resulting in the stepping-out. Examples of the external disturbance factor include a mechanical friction and a viscous load, which are liable to fluctuate during the use of the device. In addition, the torque of the stepping motor is liable to be slightly changed due to the ambient temperature, which is also an external disturbance factor.

The predetermined value $\pm K$ corresponds to a so-called motor load angle. In a strict sense, if the absolute value of the predetermined value $\pm K$ is set as corresponding to an electrical angle of less than 90 degrees, it is impossible to generate the maximum torque. However, if the lag or the lead of the rotor position occurs during the rotation, the motor load angle is correspondingly changed to fluctuate the torque. The torque fluctuations act to suppress the lag and the lead of the rotor position. This makes it possible to provide means for suppressing the fluctuations occurring due to the external disturbance, thereby improving the robustness with respect to the external disturbance. Thus, the solution to the second problem of PTL 4 can be provided.

In one embodiment of the present invention, the absolute value of the predetermined value $\pm K$ is a value corresponding to an electrical angle of not less than 60 degrees (more preferably not less than 70 degrees, still more preferably not less than 80 degrees).

This arrangement makes it possible to perform the acceleration operation and the deceleration operation with a torque close to the maximum torque, and to provide a control system which is robust with respect to the external disturbance.

In one embodiment of the present invention, the duration of an acceleration period during which the acceleration operation is performed and the duration of a deceleration period during which the deceleration operation is performed are adjusted, in the adjustment mode, so that the rotor is moved toward a target position and the rotor speed is reduced to zero at the target position by the acceleration operation and the deceleration operation. In the use mode, the acceleration operation and the deceleration operation are performed based on control data resulting from the adjustment.

With this arrangement, a rotor movement operation for moving the rotor to the target position can be optimized by adjusting the durations of the acceleration period and the deceleration period. The adjustment of the durations of the acceleration period and the deceleration period can be relatively easily achieved, because the number of parameters to be adjusted is smaller.

If a constant deceleration torque is generated and the rotor speed is correspondingly reduced at a constant deceleration rate in the deceleration operation, the duration of the deceleration period can be uniquely determined by determining the duration of the acceleration period. Since the duration of the acceleration period is virtually the only parameter to be adjusted, the adjustment is still easier. Of course, the duration of the acceleration period and the duration of the deceleration period may be individually adjusted.

In one embodiment of the present invention, the control device further includes automatic adjustment means which, in the adjustment mode, automatically adjusts the duration of the acceleration period during which the acceleration operation is performed and the duration of the deceleration period during which the deceleration operation is performed, so that the rotor is moved toward the target position and the rotor speed is reduced to zero at the target position by the acceleration operation and the deceleration operation.

With this arrangement, the duration of the acceleration period and the duration of the deceleration period can be automatically adjusted for optimization thereof. As described above, the number of parameters to be adjusted is smaller, so that an algorithm for the automatic adjustment is not complicated. Therefore, the automatic adjustment is easier.

In one embodiment of the present invention, the control data to be generated in the adjustment mode includes control data for a position holding control for controlling the winding current of the stepping motor so that the target position serves as an excitation stable point after the deceleration operation. In the adjustment mode, the control device performs a position holding operation for holding the rotor at the target position according to the control data. In the use mode, the control device performs the position holding operation for holding the rotor at the target position by reproducing the winding current of the stepping motor based on the control data generated for the position holding control in the adjustment mode after the deceleration operation.

With this arrangement, the position holding operation is performed at the target position. Where the duration of the acceleration period and the duration of the deceleration period are properly adjusted, the rotor reaches the target position at a speed of zero at the end of the deceleration period. At this time, the deceleration operation is switched to the position holding operation, whereby the rotor can be held at the target position without oscillation. Thus, the quickest positioning can be achieved.

In one embodiment of the present invention, the control data indicates at least one of a rotor position, a position command, a current command, and a voltage command.

Specifically, the control data indicating the rotor position may be data (rotor position data) which indicates the detection value of the rotor position detector obtained in the adjustment mode. The control data indicating the position command may specifically be data (position command data) which commands an excitation position. The control data indicating the current command may specifically be data which indicates a command value for the winding current of the stepping motor. The control data indicating the voltage command may specifically be data which indicates a command value for a voltage to be applied to a winding of the stepping motor. By using one or more of these data, the winding current observed in the adjustment mode can be reproduced in the use mode.

In one embodiment of the present invention, the open loop control in the use mode includes a stepping motor winding current control to be performed without the use of the detection value of the rotor position detector.

With this arrangement, the detection value of the rotor position detector is not used in the open loop control performed in the use mode. Therefore, the acceleration operation and the deceleration operation are not influenced by the detection accuracy of the rotor position detector in the use mode. This makes it possible to stably perform the operations without the need for the high precision rotor position detector.

The foregoing and other objects, features, and effects of the present invention will become more apparent from the following description of embodiments with reference to the attached drawings.

BRIEF DESCRIPTION OF DRAWINGS

FIG. 3B is a diagram showing an exemplary operation with an adjustment failure.

FIG. 8 shows angle-torque characteristics observed in an open loop control and in a closed loop control.

FIG. 13 is a flowchart for describing an exemplary automatic adjustment operation to be performed by the control device in an automatic adjustment mode.

DESCRIPTION OF EMBODIMENTS

Figure 1A:
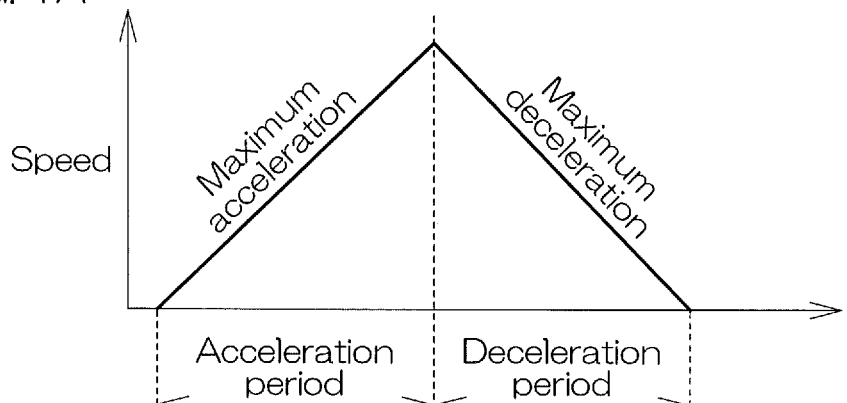
FIGS. 1A and 1B show an ideal operation for the quickest movement to a target position for positioning.
Figure 1B:
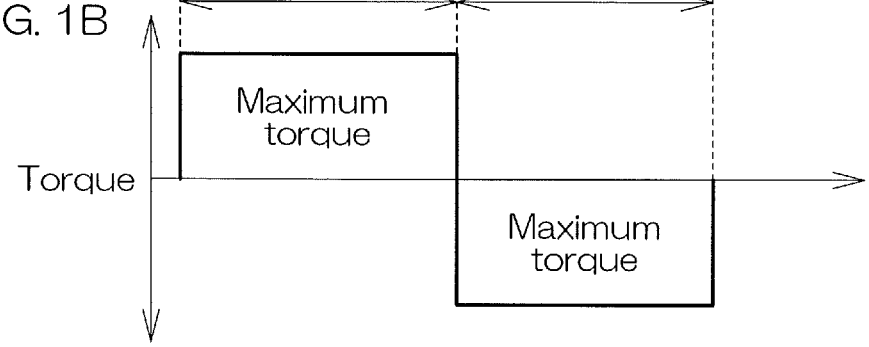

FIGS. 1A and 1B show an ideal operation for the quickest movement to a target position for positioning. FIG. 1A shows an ideal change in motor speed (rotor rotation speed) with time. FIG. 1B shows an ideal change in motor torque with time. When a movement command for movement to the target position is inputted, a maximum torque (maximum acceleration torque) to be applied in a movement direction is generated, whereby the speed is accelerated at a maximum acceleration rate. Thereafter, the direction of the torque is reversed, and a maximum torque (maximum deceleration torque) is generated in a direction opposite from the movement direction, whereby the speed is decelerated at a maximum deceleration rate. An acceleration period and a deceleration period are adjusted so that a motor position (rotor position) reaches the target position at a speed of zero at the end of the deceleration period. At the end of the deceleration period, the rotor is held at the target position by excitation at the target position.

If the maximum acceleration torque can be constantly generated during the acceleration period and the maximum deceleration torque can be constantly generated during the deceleration period, the quickest movement and positioning can be achieved by properly setting the acceleration period and the deceleration period. If the torque is constant, the constant acceleration movement is ensured, so that the rotor speed is changed in a triangular pattern with time as shown in FIG. 1A. Therefore, if the duration of the acceleration period is determined, the duration of the deceleration period is automatically correspondingly determined. Accordingly, actual adjustment is intended to find an optimum value of the duration of the acceleration period, i.e., an optimum timing at which the maximum acceleration torque is switched to the maximum deceleration torque. Since the acceleration rate in the acceleration period is smaller than the deceleration rate in the deceleration period due to an influence of a frictional load, the acceleration period is generally longer than the deceleration period. Therefore, the rotor speed is not changed in an isosceles triangular pattern with time. Even with the influence of the frictional load, however, the rotor speed is changed at a constant acceleration rate during the acceleration period and at a constant deceleration rate during the deceleration period. Therefore, the actual adjustment is still intended to find the optimum value of the duration of the acceleration period, i.e., the optimum timing of the switching from the maximum acceleration torque to the maximum deceleration torque.

As will be described below, the torque is fluctuated in the full-step driving during the acceleration period and the deceleration period, making it impossible to maintain the maximum acceleration torque during the acceleration period and to maintain the maximum deceleration torque during the deceleration period.

A hybrid type stepping motor, for example, includes a rotor having a plurality of small teeth (rotor small teeth) circumferentially provided equidistantly at a constant small tooth pitch, and a stator disposed in opposed relation to the rotor. More specifically, the rotor includes two rotor segments offset from each other by half the small tooth pitch about a rotation shaft and fixed to the rotation shaft. One of the rotor segments is magnetized to S-polarity, while the other rotor segment is magnetized to N-polarity. A plurality of small teeth (e.g., 100 small teeth) are equidistantly disposed at the constant small tooth pitch circumferentially of each of the rotor segments. The stator includes a plurality of main poles each having small teeth (stator small teeth) disposed at the same small tooth pitch as the rotor.

Where the stepping motor is a two-phase stepping motor, the stepping motor has A-phase, B-phase having a 90-degree phase shift with respect to the A-phase, /A-phase having a 180-degree phase shift with respect to the A-phase, and /B-phase having a 180-degree phase shift with respect to the B-phase. The stator has a plurality of main poles respectively having windings to which A-phase current, B-phase current, /A-phase current and /B-phase current are respectively applied, and each including stator small teeth provided thereon in opposed relation to the rotor. When the stator small teeth on the A-phase main pole are opposed to rotor small teeth, the stator small teeth on the B-phase main pole are offset from rotor small teeth by a ¼ pitch (an electrical angle of 90 degrees), and the stator small teeth on the /A-phase main pole are offset from rotor small teeth by a 2/4 pitch (an electrical angle of 180 degrees). Further, the stator small teeth on the /B-phase main pole are offset from rotor small teeth by a ¾ pitch (an electrical angle of 270 degrees).

In two-phase excitation full-step driving, the driving state is switched to the following four states. In a first state, the A-phase pole is excited to the N-polarity, the B-phase pole is excited to the N-polarity, the /A-phase pole is excited to the S-polarity, and the /B-phase pole is excited to the S-polarity (AB-phase excitation). In a second state, the A-phase pole is excited to the S-polarity, the B-phase pole is excited to the N-polarity, the /A-phase pole is excited to the N-polarity, and the /B-phase pole is excited to the S-polarity (B/A-phase excitation). In a third state, the A-phase pole is excited to the S-polarity, the B-phase pole is excited to the S-polarity, the /A-phase pole is excited to the N-polarity, and the /B-phase pole is excited to the N-polarity (/A/B-phase excitation). In a fourth state, the A-phase pole is excited to the N-polarity, the B-phase pole is excited to the S-polarity, the /A-phase pole is excited to the S-polarity, and the /B-phase pole is excited to the N-polarity (/BA-phase excitation).

In the first state of the AB-phase excitation, the A-phase and B-phase main poles are of the N-polarity, and the /A-phase and /B-phase main poles are of the S-polarity. Therefore, excitation stable points are such that the rotor small teeth of the S-polarity rotor segment are located at middle positions (middle electrical angle positions) between the A-phase stator small teeth and between the B-phase stator small teeth, and the rotor small teeth of the N-polarity rotor segment are located at middle positions (middle electrical angle positions) between the /A-phase stator small teeth and between the /B-phase stator small teeth. When the driving state is switched from this state to the second state of the B/A-phase excitation, the B-phase and /A-phase main poles are of the N-polarity, and the /B-phase and A-phase main poles are of the S-polarity. Thus, the B-phase and /A-phase stator small teeth are attracted to the rotor small teeth of the S-polarity rotor segment, and the /B-phase and A-phase stator small teeth are attracted to the rotor small teeth of the N-polarity rotor segment, whereby the torque is correspondingly generated. Where the rotor small teeth are offset from excitation stable points, which are middle positions (middle electrical angle positions) between the B-phase stator small teeth and between the /A-phase stator small teeth, by a ¼ pitch (by an electrical angle of 90 degrees), the torque is maximized. At this time, the maximum torque is generated. As the rotor is rotated, the rotor small teeth each approach the excitation stable point, i.e., the electrical angle offset is reduced, and the torque is correspondingly reduced. When the rotor is further rotated by a ¼ pitch (by an electrical angle of 90 degrees), the rotor small teeth of the S-polarity rotor segment reach the middle positions (middle electrical angle positions) between the B-phase stator small teeth and between the /A-phase stator small teeth. Thus, one-step movement (rotation) is completed. In this manner, the rotor can be moved step by step and positioned by sequentially switching the excitation phase to the AB-phase, to the B/A-phase, to the /A/B-phase, and to the /BA-phase.

The ¼ pitch (one-fourth the small tooth pitch) corresponds to the basic step angle of the stepping motor. In the full-step driving, the rotor can be rotated at a pitch of the basic step angle, and the rotor position can be held. A stepping motor driver for the full-step driving sequentially switches the excitation phase to the AB-phase, to the B/A-phase, to the /A/B-phase, and to the /BA-phase whenever a pulse is inputted thereto. Thus, the rotor of the stepping motor is rotated in a forward rotation direction (CW: clockwise direction). By reversing the excitation phase order, the rotor can be rotated in a reverse rotation direction (CCW: counterclockwise direction).

In other words, an acceleration torque for accelerating the rotor in the forward rotation direction can be generated by selecting the excitation phase in a forward rotation phase order (in the order of the AB-phase, the B/A-phase, the /A/B-phase, and the /BA-phase) according to the rotor position. Further, an acceleration torque for accelerating the rotor in the reverse rotation direction can be generated by selecting the excitation phase in a reverse rotation phase order (in the order of the /BA-phase, the /A/B-phase, the B/A-phase, and the AB-phase) according to the rotor position.

Figure 2:
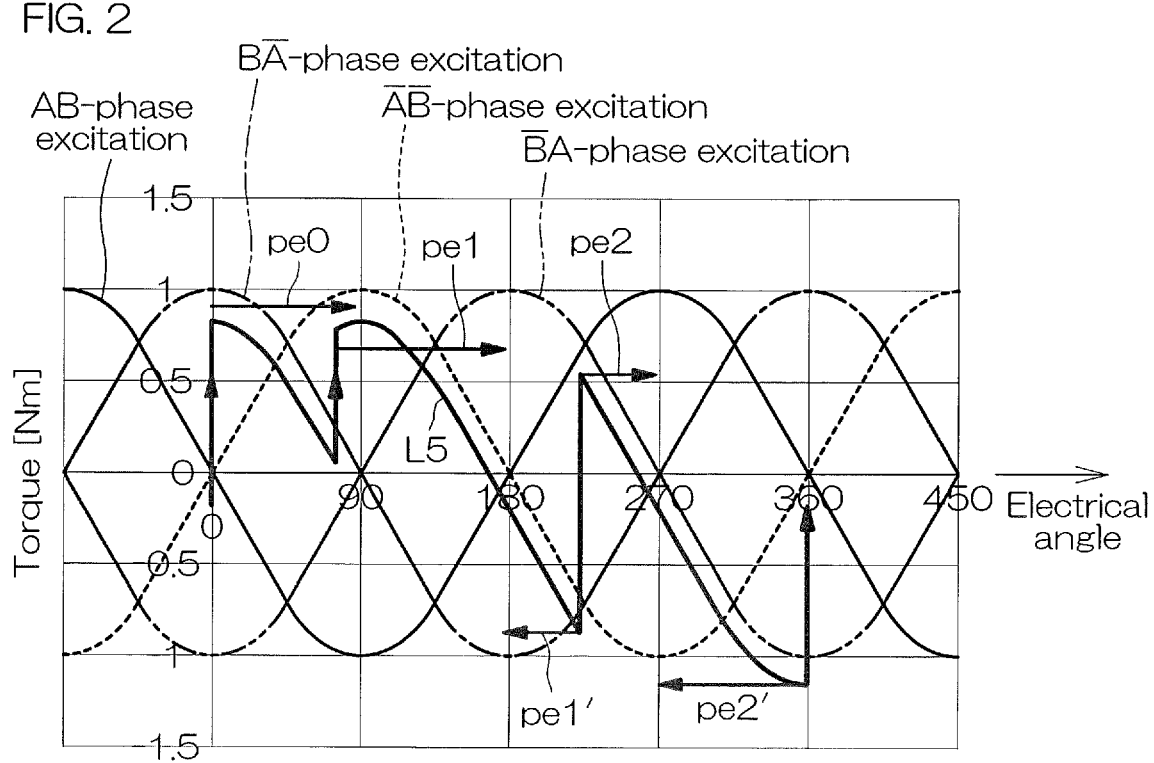
FIG. 2 is a diagram for describing torque fluctuations during full-step driving.

FIG. 2 is a diagram for describing torque fluctuations in the full-step driving. FIG. 2 shows θ-T characteristics indicating relationships between the rotor position (electrical angle) and the generated torque in the respective excitation states. An electrical angle of 0 degree corresponds to the state in which the S-polarity rotor small teeth are located at the middle positions (middle electrical angle positions) between the A-phase stator small teeth and between the B-phase stator small teeth. This indicates that no torque is generated in the AB-phase excitation, that the maximum acceleration torque (the maximum torque in the forward rotation direction) is generated in the B/A-phase excitation, that no torque is generated in the /A/B-phase excitation, and that the maximum deceleration torque (the maximum torque in the reverse rotation direction) is generated in /BA-phase excitation. The θ-T characteristic for the B/A-phase excitation indicates that, when the rotor position corresponds to an electrical angle of 0 degree, the maximum acceleration torque is generated but, as the rotor position is changed with the electrical angle increasing from 0 degree, the torque is reduced, and that the direction of the torque is reversed when the electrical angle exceeds 90 degrees.

Figure 3A:
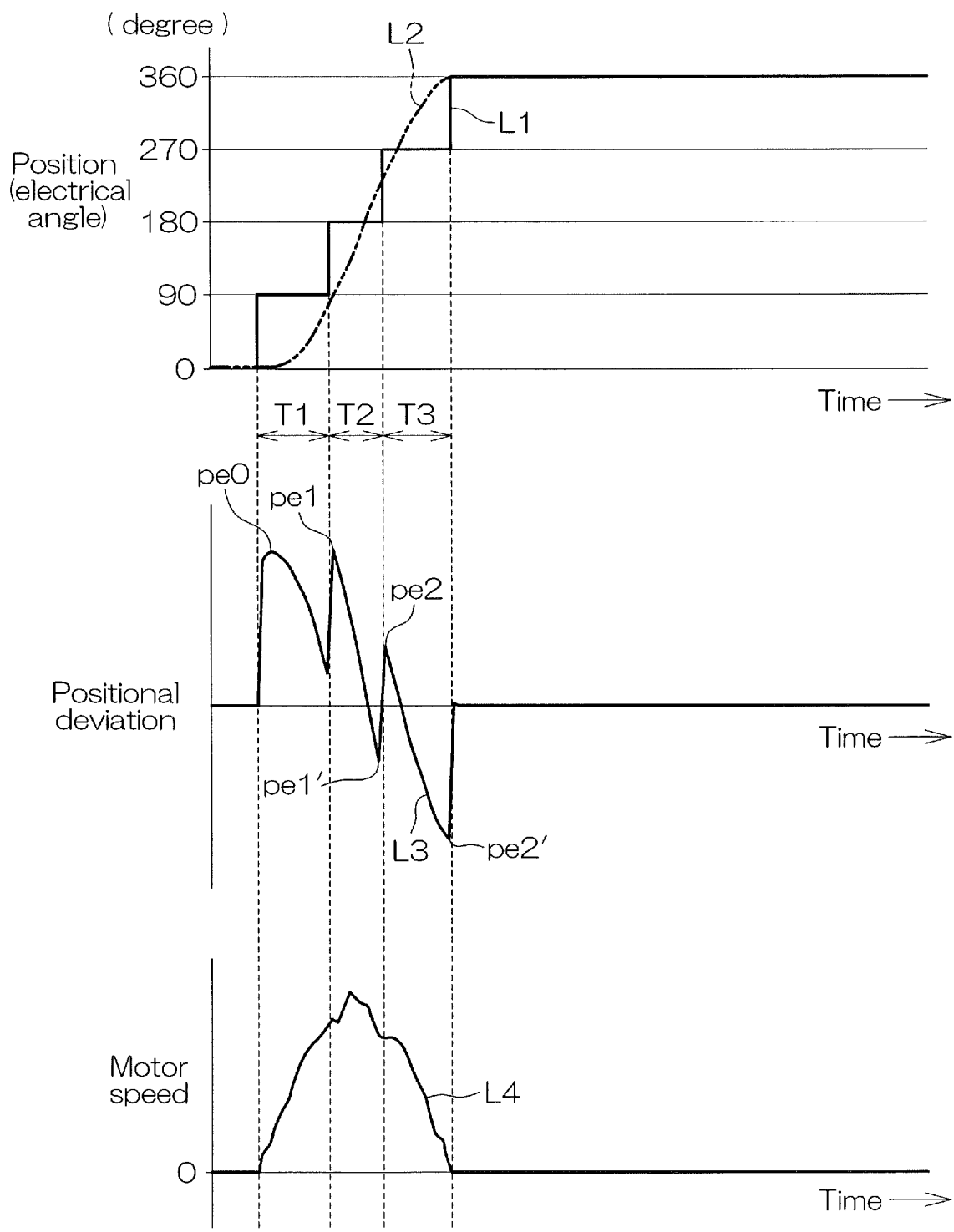
FIG. 3A is a diagram for describing an exemplary operation for the quickest movement and positioning by the full-step driving.

FIG. 3A is a diagram for describing an exemplary operation for the quickest movement and positioning by the full-step driving. FIG. 3B is a diagram showing an exemplary operation with an adjustment failure. In FIGS. 3A and 3B, a line L1 indicates a change in the command value of the motor position (command position) with time, and a line L2 indicates a change in motor position (actual position) with time. A line L3 indicates a change in a deviation between the command position and the actual position with time, and a line L4 indicates a change in motor speed with time. In FIG. 3B, the positional deviation (line L3) is not shown.

PTL 2 discloses the art for the movement and the positioning based on four steps (i.e., by the small tooth pitch) by the full-step driving. Exemplary operations for the four-step movement and positioning, as disclosed in PTL 2, by positional control based on input of the command position are shown in FIGS. 3A and 3B.

In an initial state before the movement, the rotor position is maintained by the AB-phase excitation. This state is defined as corresponding to an electrical angle of 0 degree. A command position in the first step corresponds to an electrical angle of 90 degrees, and a command position in the second step corresponds to an electrical angle of 180 degrees. A command position in the third step corresponds to an electrical angle of 270 degrees, and a command position in the fourth step corresponds to an electrical angle of 360 degrees (=0 degree). In the two-phase excitation system, therefore, the B/A-phase excitation is caused in the first step, and /A/B-phase excitation is caused in the second step. Further, the /BA-phase excitation is caused in the third step, and the AB-phase excitation is caused in the fourth step.

Then, the time durations T1, T2 and T3 of the first step, the second step and the third step are properly adjusted, whereby the rotor can reach the target position (an electrical angle of 360 degrees) at a speed of zero at the end of the third step (/BA-phase excitation) and can be held at the target position by the fourth step (AB-phase excitation) as shown in FIG. 3A.

If the adjustment is improper, the rotor does not reach the target position at the end of the third step as shown in FIG. 3B, and the rotor is accelerated by the excitation at the target position in the fourth step (AB-phase excitation), whereby the rotor position oscillates. This results in a positioning failure.

Since the command position (line L1) is not changed during each of the first to fourth step periods, the positional deviation (line L3) is fluctuated as the rotor position (line L2) is changed. The generated torque is correlated with the positional deviation.

A relationship of the generated torque versus the rotor position has been determined based on the positional deviations in the first to fourth steps, and the determination result is shown in the form of line L5 in FIG. 2. The line L5 corresponds to an ideal scenario (see FIG. 3A) in which the rotor reaches the target position at a speed of zero at the end of the third step.

At the beginning of the first step (B/A-phase excitation) (at an electrical angle of about 0 degree), a greater positional deviation pe0 occurs to generate the maximum acceleration torque. Thereafter, as the rotor is rotated, the positional deviation is reduced and the torque is correspondingly reduced. At the end of the first step (at an electrical angle of about 90 degrees), the acceleration torque is almost zero. At the beginning of the second step (/A/B-phase excitation) (at an electrical angle of about 90 degrees), a greater positional deviation pe1 occurs again to generate a greater acceleration torque. Thereafter, as the rotor is rotated, the torque is reduced, and changed into a deceleration torque when the electrical angle exceeds 180 degrees. Then, the absolute value of the positional deviation is increased, whereby the deceleration torque is increased. At the end of the second step (at an electrical angle of about 225 degrees), a negative positional deviation pe1' having a greater absolute value occurs to generate a relatively great deceleration torque. At the beginning of the third step (/BA-phase excitation) (at an electrical angle of about 225 degrees), a positive positional deviation pet occurs to generate an acceleration torque again. As the rotor is rotated, the torque is reduced to be changed into a deceleration torque at an electrical angle of about 270 degrees. As the end of the third step (at an electrical angle of about 360 degrees) is approached, the deceleration torque is increased, and a negative positional deviation pet' having a greater absolute value occurs, indicating that the rotor rotation is decelerated (braked). In the fourth step (AB-phase excitation), the generated torque is reduced to zero, and the rotor position is maintained.

In one-pitch movement by the full-step driving, the generated torque thus significantly changes as the rotor is rotated. Therefore, it is impossible to efficiently utilize the torque generated by the stepping motor, because the maximum torque or a torque close to the maximum torque cannot be constantly utilized. In addition, as indicated by the line L5 in FIG. 2, the torque is switched between the acceleration torque and the deceleration torque, i.e., the torque direction is reversed, a plurality of times (three times in the exemplary case of the line L5 in FIG. 2). Therefore, the one-pitch movement by the full-step driving is far from the ideal positioning operation shown in FIG. 1, so that the torque cannot be efficiently utilized.

This is also true in the case of single-phase excitation full-step driving. Where a 1-2-phase excitation system is employed, the step angle is half the basic step angle (i.e., so-called half-step driving). As in the full-step driving, the torque is fluctuated by the change in the rotor position.

Figure 4A:
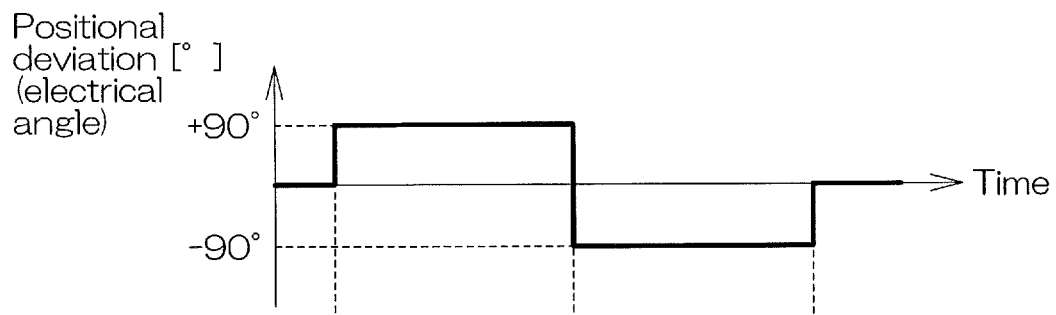
FIGS. 4A, 4B and 4C show operation patterns for the quickest movement and positioning operation by acceleration and deceleration with a maximum torque.
Figure 4B:
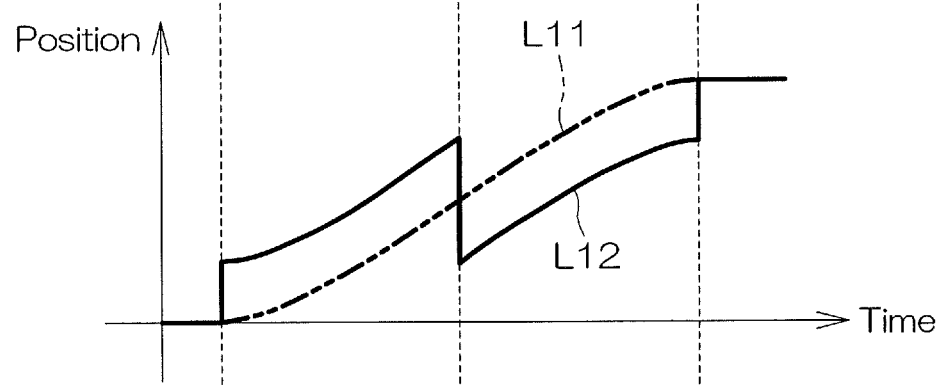
Figure 4C:
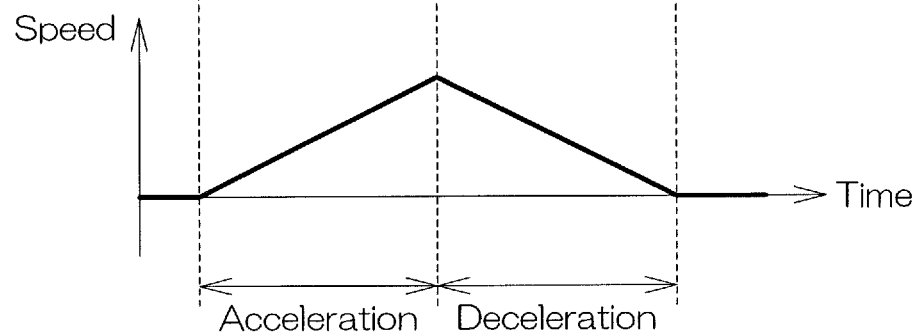

FIGS. 4A, 4B and 4C show operation patterns for the quickest movement and positioning operation by the acceleration and the deceleration with the maximum torque. FIG. 4A shows a change in the deviation (the positional deviation) of the rotor actual position against the command position with time. FIG. 4B shows a change in the rotor actual position with time (line L11), and a change in the command position with time (line L12). FIG. 4C shows a change in the rotor speed with time.

The one-pitch movement period is divided into an acceleration period and a deceleration period. Then, the quickest movement of the rotor to the target position can be achieved by continuously generating the maximum acceleration torque during the acceleration period and continuously generating the maximum deceleration torque during the deceleration period. To this end, as shown in FIG. 4A, the stepping motor may be controlled so that the positional deviation is maintained at an electrical angle of +90 degrees during the acceleration period, and the positional deviation is maintained at an electrical angle of −90 degrees during the deceleration period. Such a control operation cannot be achieved by the full-step driving, but can be achieved by the micro-step driving. PTL 3 states that the maximum torque cannot be generated through the two-phase excitation by the micro-step driving (see paragraph [0004] in PTL 3), but this is not true.

A constant winding current is used in the full-step driving, while a current of an intermediate level is used at a current switching point in the micro-step driving. The step angle can be finely divided by switching the excitation phase while changing the current value to a multiplicity of intermediate current levels without changing the mechanical structure of the stepping motor. By increasing the number of the intermediate current levels, the step angle is reduced, making it possible to apply a driving current that is substantially continuously changeable. This means that the positional control can be achieved by applying a command position that is substantially continuously changeable.

A change in the rotor position corresponding to a speed change in a triangular pattern achieved by constantly generating the maximum torque (see FIG. 4C, constant acceleration movements in the acceleration period and in the deceleration period) is indicated by the line L11 in FIG. 4B. Therefore, as indicated by the line L12, the micro-step driving is performed by applying a command position continuously changeable so as to provide a positional deviation of an electrical angle of +90 degrees in the acceleration period and applying a command position continuously changeable so as to provide a positional deviation of an electrical angle of −90 degrees in the deceleration period. Thus, the acceleration can be achieved with the maximum torque in the entire acceleration period, and the deceleration can be achieved with the maximum torque in the entire deceleration period.

Then, the timing of the switching between the acceleration period (the maximum acceleration torque period) and the deceleration period (the maximum deceleration torque period) is properly adjusted so that the target position is reached at a speed of zero at the end of the deceleration period. Thus, the quickest movement to the target position, and the quickest positioning at the target position without the oscillation can be achieved.

Since the maximum torque can be utilized in the entire movement periods, the positioning can be achieved in a shorter period of time than the positioning by the ideally adjusted full-step driving. In addition, the full-step driving requires the adjustment of the time durations T1, T2 and T3 of the first step, the second step and the third step. For the positioning by the micro-step driving, in contrast, it is merely necessary to adjust the timing of the switching between the acceleration period and the deceleration period, i.e., to adjust the duration of the acceleration period; therefore, the adjustment is significantly easier.

In FIGS. 4A to 4C, the acceleration period and the deceleration period are illustrated as having the same duration but, in practice, the duration of the acceleration period is longer than the duration of the deceleration period due to the influence of the frictional load.

Figure 5:
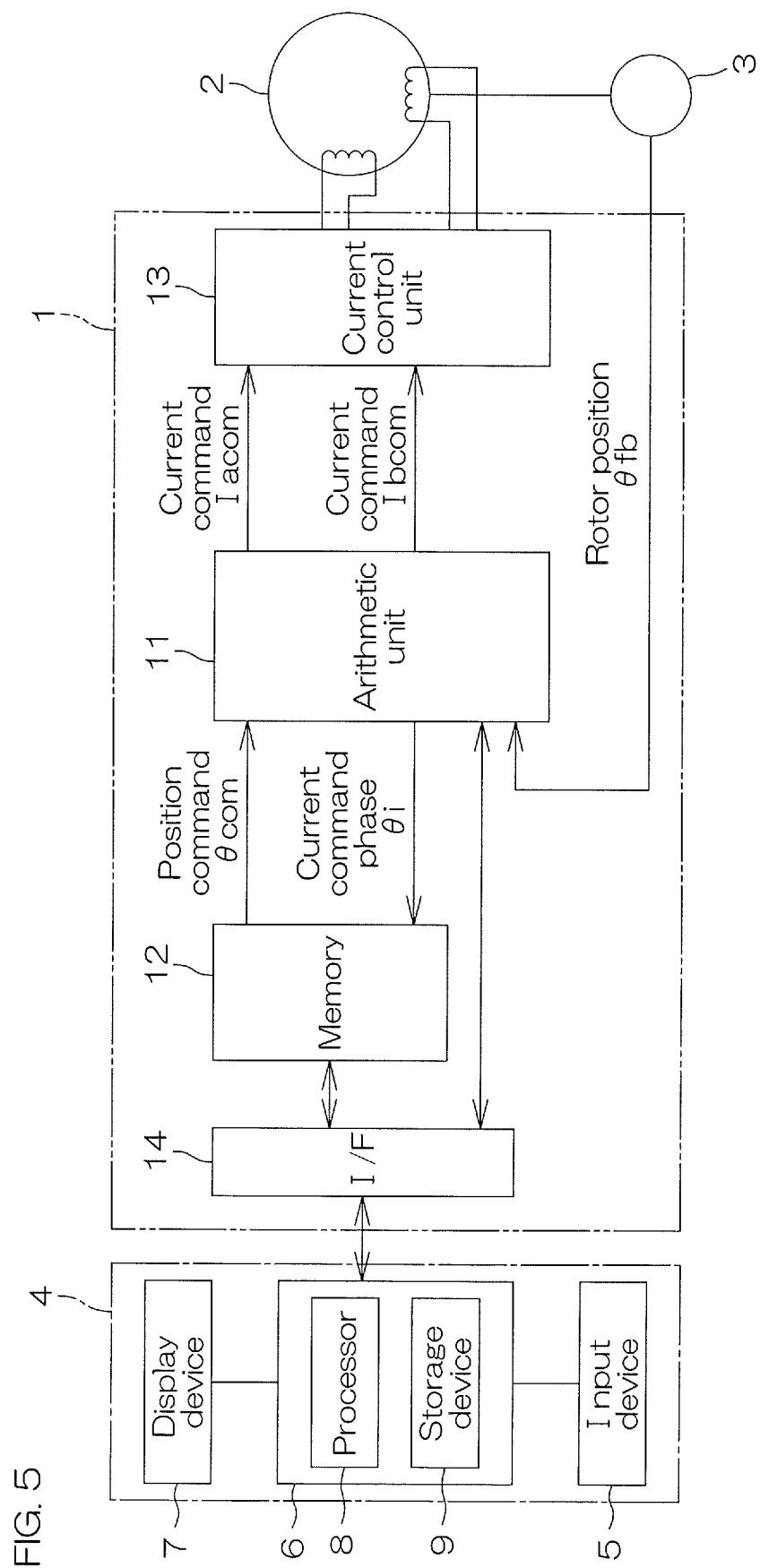
FIG. 5 is a block diagram for describing an exemplary construction of a stepping motor control device according to an embodiment of the present invention.

FIG. 5 is a block diagram for describing an exemplary construction of a stepping motor control device according to an embodiment of the present invention. The stepping motor control device 1 controls a stepping motor 2 by the micro-step driving. The stepping motor 2 may be, for example, a two-phase hybrid stepping motor. The basic step angle may be, for example, 0.9 degrees. As described above, the basic step angle corresponds to one-fourth the rotor small tooth pitch. That is, where the rotor small tooth pitch is 3.6 degrees, the basic step angle is 0.9 degrees. A rotor position detector 3 (position sensor) is attached to the stepping motor 2. The rotor position detector 3 is fixed to a rotor shaft of the stepping motor 2, and detects a rotor position θfb.

The control device 1 includes an arithmetic unit 11, a memory 12, and a current control unit 13. The arithmetic unit 11 is typically a microprocessor. The memory 12 is connected to the arithmetic unit 11. The memory 12 may include a single or a plurality of storage media. The memory 12 preferably includes rewritable storage media capable of retaining data even when the power supply is off. The arithmetic unit 11 is capable of performing computation and controlling the current control unit 13 while communicating with the memory 12 for data exchange.

A plurality of rotor position commands θcom (position command data commanding the rotor positions) at an interval of a predetermined control cycle period (e.g., 62.5 microseconds, corresponding to 16 KHz) can be stored in the memory 12. The rotor position commands θcom at the interval of the control cycle period define a profile of the rotor position commands (position command profile) which varies with time. The memory 12 may have a capacity sufficient to store a plurality of position command profiles. An array variable θcom(n) indicating rotor position commands for the respective control cycles in time sequence may be stored in the memory 12, and the position command profile may be defined by the array variable θcom(n).

As will be described later, the control device 1 is operable in a plurality of operation modes including an adjustment mode and a use mode. At least one position command profile to be applied in the adjustment mode (hereinafter referred to as "adjustment mode profile") and a position command profile to be applied in the use mode (hereinafter referred to as "use mode profile") can be stored in the memory 12.

A control program to be executed by the arithmetic unit 11 is further stored in the memory 12. The arithmetic unit 11 executes the control program to control the stepping motor 2. Specifically, the arithmetic unit 11 reads out a rotor position command θcom from the memory 12 at the predetermined control cycle, and compares the rotor position command θcom with the rotor position θfb. Then, the arithmetic unit 11 generates motor winding current commands Iacom, Ibcom according to the result of the comparison, and supplies the motor winding current commands Iacom, Ibcom to the current control unit 13. The current control unit 13 supplies currents to the respective phase windings of the stepping motor 2 based on the motor winding current commands Iacom, Ibcom. The current control unit 13 includes, for example, a two-phase invertor circuit, which amplifies an A-phase motor winding current command Iacom and a B-phase motor winding current command Ibcom, and applies the currents to the A-phase and B-phase windings of the stepping motor 2.

The control device 1 has an interface 14 for connection to external devices. A setting device 4 may be connected to the interface 14. Not only the control device 1 but also the setting device 4 may be regarded as constituent members of the control device for the stepping motor 2.

The setting device 4 may be a personal computer. The setting device 4 includes, for example, an input device 5, a processing device 6 and a display device 7. The processing device 6 includes a processor 8 and a storage device 9. The storage device 9 may include a memory element, and may include an auxiliary storage device such as SDD (solid state drive) and HDD (hard disk drive). The processor 8 executes a program stored in the storage device 9 to thereby perform various functions. In this embodiment, the processor 8 particularly performs a function of generating a command for switching the operation mode of the control device 1, a function of giving a command for driving the stepping motor 2 to the control device 1, a function of acquiring data about the operation of the stepping motor 2 from the control device 1, a function of writing the position command profile in the memory 12 of the control device 1, and a function of modifying the position command profile in the memory 12 of the control device 1.

The setting device 4 may be connected to the control device, as required, when the control operation of the stepping motor 2 is set or adjusted. The setting device 4 is capable of setting or changing data (particularly, the position command profile) in the memory 12, and giving an operation command for operating the stepping motor 2 to the arithmetic unit 11. Further, the setting device 4 is capable of acquiring data from the arithmetic unit 11 and displaying the operation state of the stepping motor 2 on the display device 7. Specifically, the setting device 4 may be configured so as to acquire a rotor position signal detected by the rotor position detector 3 and a rotor speed signal obtained by differentiating the rotor position signal via the interface 14.

Figure 6:
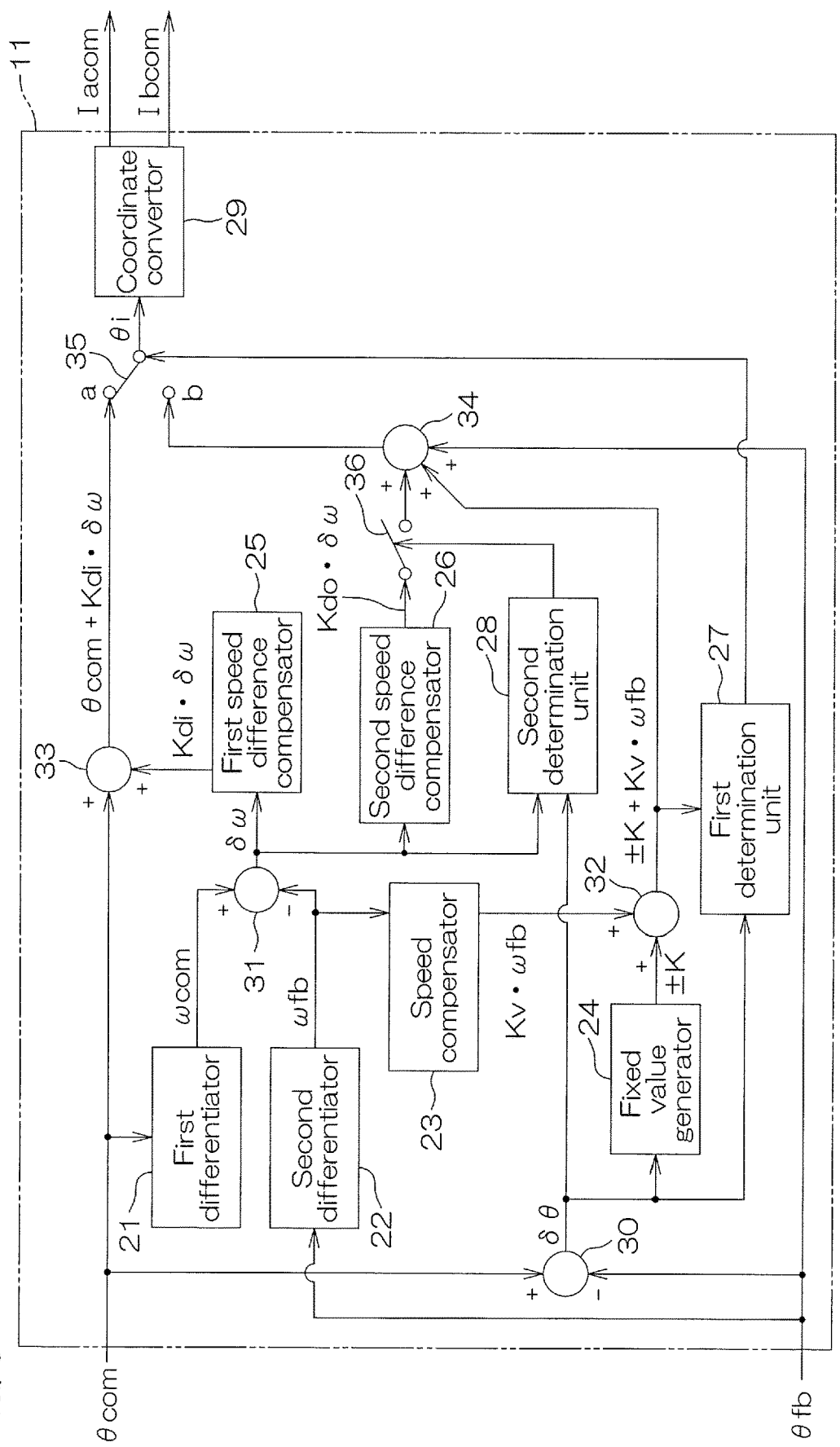
FIG. 6 is a control block diagram for describing an exemplary process to be performed by an arithmetic unit provided in the control device.

FIG. 6 is a control block diagram for describing an exemplary process to be performed by the arithmetic unit 11. The arithmetic unit 11 executes the control program stored in the memory 12 to perform the functions of functional blocks shown in FIG. 6. The functional blocks include a first differentiator 21, a second differentiator 22, a speed compensator 23, a fixed value generator 24, a first speed difference compensator 25, a second speed difference compensator 26, a first determination unit 27, a second determination unit 28, a coordinate convertor 29, a first subtracter 30, a second subtracter 31, a first adder 32, a second adder 33, a third adder 34, a first switch element 35, a second switch element 36, and the like. However, it is not essential that all these blocks are included as the functional blocks.

The first subtracter 30 computes a positional deviation $\delta\theta$ between the rotor position command θcom and the rotor position θfb (actual position). The first differentiator 21 differentiates the rotor position command θcom to generate a speed command ωcom. The first differentiator 21 may be obviated. The second differentiator 22 differentiates the rotor position θfb (actual position) to generate a rotor speed ωfb (rotor rotation speed). The speed compensator 23 multiplies the rotor speed ωfb by a proportional constant Kv for speed compensation. The fixed value generator 24 generates a fixed value +K (K>0) when the positional deviation $\delta\theta$ is positive, and generates a fixed value −K when the positional deviation $\delta\theta$ is negative.

Different values may be used as the fixed value K in the adjustment mode and in the use mode. For example, the fixed value K to be used in the adjustment mode is preferably a value corresponding to an electrical angle of less than 90 degrees. Further, the fixed value K to be used in the adjustment mode is preferably a value corresponding to an electrical angle of not less than 60 degrees (more preferably not less than 70 degrees, still more preferably not less than 80 degrees). In the use mode, the fixed value K may be a value corresponding to an electrical angle of 90 degrees.

The second subtracter 31 subtracts the rotor speed ωfb (actual speed) from the speed command ωcom, and outputs a speed deviation δω. The second subtracter 31 may be obviated. The first adder 32 adds the fixed value +K or −K generated by the fixed value generator 24 to Kv·ωfb, the output of the speed compensator 23.

The first speed difference compensator 25 and the second speed difference compensator 26 multiplies the speed deviation δω outputted from the subtracter 31 by proportional constants Kdi and Kdo, respectively, for speed difference compensation. The first speed difference compensator 25 and the second speed difference compensator 26 may be obviated.

The first determination unit 27 compares the positional deviation $\delta\theta$ with K+Kv·ωfb or −K+Kv·ωfb, the output of the first adder 32. If −K+Kv·ωfb<$\delta\theta$<K+Kv·ffb, the first determination unit 27 connects the first switch element 35 to a-side terminal to select the output of the second adder 33. If this condition is not satisfied, the first determination unit 27 connects the first switch element 35 to b-side terminal to select the output of the third adder 34. If the signs (positive or negative signs) of the positional deviation $\delta\theta$ and the speed deviation δω do not coincide with each other, the second determination unit 28 turns on the second switch element 36 to enable the function of the second speed difference compensator 26. If these signs coincide with each other, the second determination unit 28 turns off the second switch element 36 to disable the function of the second speed difference compensator 26.

The second adder 33 adds $Kdi \cdot \delta\omega$, the output of the first speed difference compensator 25 to the rotor position command $\theta$com, and applies the addition result to the a-side terminal of the first switch element 35. The second adder 33 may be obviated. The third adder 34 adds $Kdo \cdot \delta\omega$, the output of the second speed difference compensator 26 applied via the second switch element 36 and $K+Kv \cdot ffb$ or $-K+Kv \cdot ffb$, the output of the first adder 32 to the rotor position $\theta$fb, and applies the addition result to the b-side terminal of the first switch element 35. The second switch element 36 may be obviated.

The coordinate convertor 29 outputs the current commands Iacom=Ki·sin $\theta$i and Ibcom=Ki·cos $\theta$i based on a current command phase $\theta$i applied thereto via the first switch element 35 as will be described later, wherein Ki is a constant.

With this arrangement, the arithmetic unit 11 computes the current command phase $\theta$i based on either of the rotor position command $\theta$com and the rotor position $\theta$fb (actual position), and generates the A-phase current command Iacom and the B-phase current command Ibcom based on the current command phase $\theta$i. Where the current command phase $\theta$i computed based on the rotor position command $\theta$com is used, the control system is the same as the ordinary open loop stepping motor control system since the rotor position $\theta$fb is not used.

Figure 7:
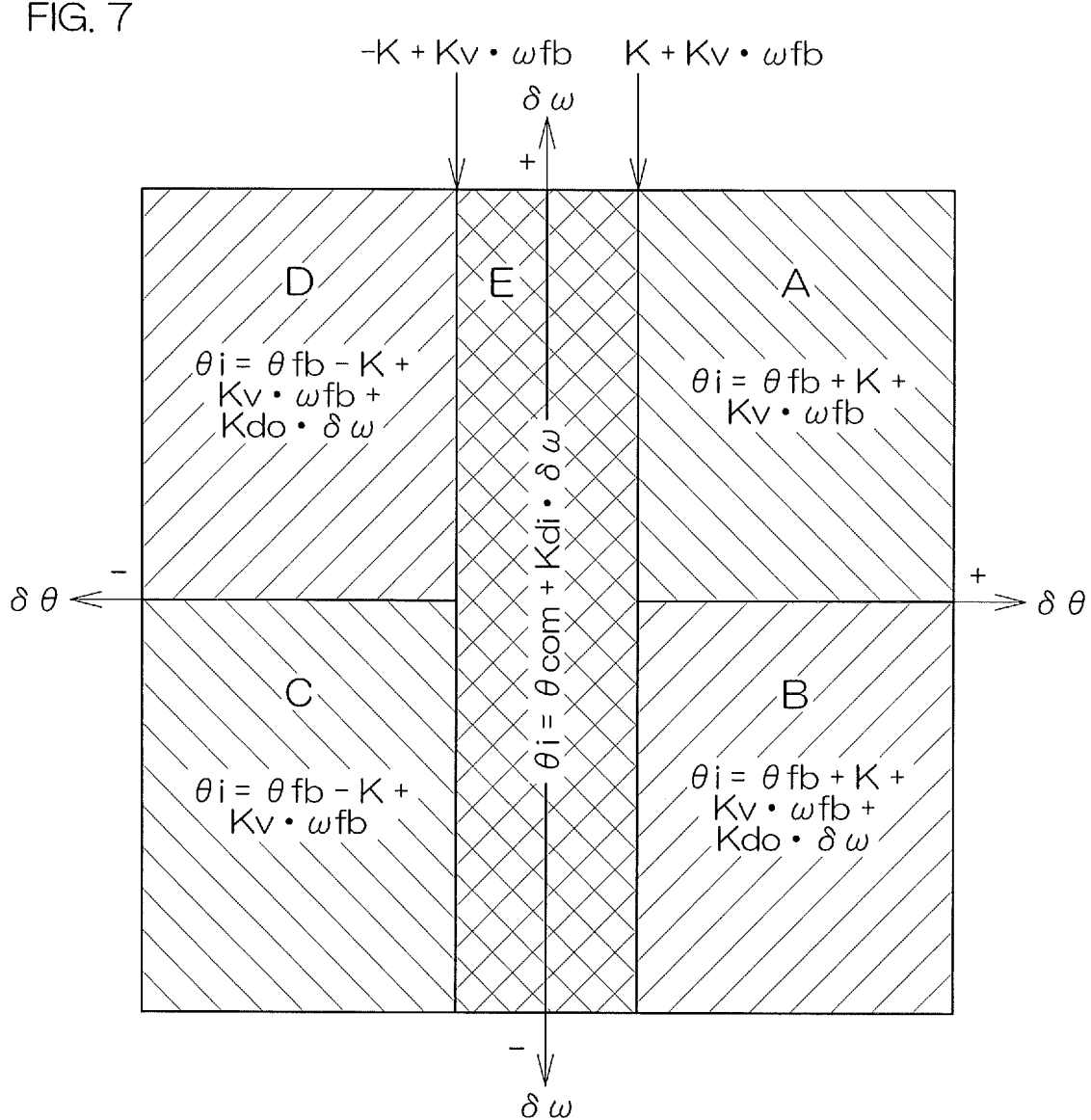
FIG. 7 is a diagram for describing control areas of the arithmetic unit.

FIG. 7 is a diagram for describing control areas of the arithmetic unit 11. The arithmetic unit 11 has a plurality of control areas A to E defined according to the positional deviation $\delta\theta$ and the speed deviation $\delta w$. Specifically, two thresholds $-K+Kv \cdot \omega fb$ and $+K+Kv \cdot ffb$ are specified for the positional deviation $\delta\theta$, whereby three control areas D, C; E; A, B are defined. Further, either one of the control areas C, D or either one of the control areas A, B is selected based on whether or not the sign of the speed deviation $\delta\omega$ coincides with the sign of the positional deviation $\delta\theta$.

The control area E is an open loop area in which the current command phase $\theta$i is determined based on the rotor position command $\theta$com. The control areas A to D are closed loop areas in which the current command phase $\theta$i is determined based on the rotor position $\theta$fb. Whether the current command phase $\theta$i is computed based on the rotor position command $\theta$com or based on the rotor position $\theta$fb, i.e., whether the open loop control or the closed loop control is employed, is determined based on the positional deviation $\delta\theta$.

Specifically, when the positional deviation $\delta\theta$ satisfies the following expression (1), the first determination unit 27 connects the switch element 35 to the a-side terminal. Thus, an addition result of the adder 33 (as represented by the following expression (2)) is outputted as the current command phase $\theta$i from the switch element 35.

$$-K+Kv \cdot \omega fb < \delta\theta < +K+Kv \cdot ffb \quad (1)$$

$$\theta i = \theta com + Kdi \cdot \delta\omega \quad (2)$$

If the positional deviation $\delta\theta$ thus falls within a range represented by the expression (1), the current command phase $\theta$i is computed based on the rotor position command $\theta$com to perform the open loop control (see the area E in FIG. 7).

The current command phase $\theta$i may be $\theta i=\theta com$. Where a term $Kdi \cdot \delta\omega$ based on the speed deviation $\delta\omega$ is added as in the expression (2), vibrations during the rotation can be effectively suppressed. Where the suppression of the vibrations is not necessary, the vibration suppressing term $Kdi \cdot \delta\omega$ is nullified with Kdi=0. In this case, the first speed difference compensator 25 and the second adder 33 may be obviated.

When the positional deviation $\delta\theta$ falls outside the range represented by the expression (1), i.e., $\delta\theta > +K+Kv \cdot ffb$ or $\delta\theta < -K+Kv \cdot \omega fb$, the first determination unit 27 connects the switch element 35 to the b-side terminal. In this case, the second determination unit 28 turns off the switch element 36 only when the signs (positive or negative signs) of the positional deviation $\delta\theta$ and the speed deviation $\delta\omega$ coincide with each other. Consequently, four current command phases $\theta$i are computed according to the following conditions (a) to (d) (see the areas A to D in FIG. 7), and are outputted from the switch element 35 according to the conditions (a) to (d).

Condition (a) (area A): $\delta\theta > +K+Kv \cdot ffb$, $\delta\theta > 0$, $\delta\omega > 0$ $$\theta i = \theta fb + K + Kv \cdot ffb \quad (3)$$

Condition (b) (area B): $\delta\theta > +K+Kv \cdot ffb$, $\delta\theta > 0$, $\delta\omega < 0$ $$\theta i = \theta fb + K + Kv \cdot \omega fb + Kdo \cdot \delta\omega \quad (4)$$

Condition (c) (area C): $\delta\theta < -K+Kv \cdot ffb$, $\delta\theta < 0$, $\delta\omega < 0$ $$\theta i = \theta fb - K + Kv \cdot \omega fb \quad (5)$$

Condition (d) (area D): $\delta\theta < -K+Kv \cdot ffb$, $\delta\theta < 0$, $\delta\omega > 0$ $$\theta i = \theta fb - K + Kv \cdot \omega fb + Kdo \cdot \delta\omega \quad (6)$$

The current command phases $\theta$i computed from the expression (2) and the expressions (3) to (6) are inputted to the coordinate convertor 29, and each converted to the current commands Iacom, Ibcom for the respective phases.

The stepping motor 2 is not limited to the two-phase stepping motor, but may be, for example, of a three-phase structure or of a five-phase structure. In this case, the coordinate convertor 29 converts the current command phase $\theta$i into current commands of a number corresponding to the number of the phases of the stepping motor 2.

According to the current command phase $\theta$i represented by the expression (2), the stepping motor 2 is accelerated to a command speed with the maximum torque when the fixed value K is the value corresponding to an electrical angle of 90 degrees. When the fixed value K is close to the value corresponding to an electrical angle of 90 degrees, a torque close to the maximum torque can be generated. At this time, the switching can be achieved at a maximum torque generating point which is compensated for the lag of the current due to the winding inductance and the delay of the computation, because a speed compensation term $Kv \cdot ffb$ is included in the discriminant (1).

According to the current command phase $\theta$i determined based on the rotor position $\theta$fb (actual position), i.e., the current command phases $\theta$i computed from the expressions (3) to (6), on the other hand, the closed loop control can be achieved, and the following effects can be provided. Where the stepping motor 2 is over-rotated in the forward rotation direction, for example, the speed deviation $\delta\omega$ is negative and the positional deviation $\delta\theta$ is positive and, therefore, the current command phase $\theta$i is determined based on the expression (4). In this case, the third term $Kdo \cdot \delta\omega$ in the expression (4) is a negative value and, therefore, the lead angle with respect to the rotor position $\theta$fb is reduced, resulting in a reduced torque.

The excitation phase is set so that the generated torque is thus reduced to suppress the speed deviation. This makes it possible to stably and quickly position the rotor while preventing the over-rotation of the rotor and the hunting (overshoot and undershoot) of the rotor due to the expansion of the speed deviation. The current command phase θi computed from the expression (6) also makes it possible to stably and quickly position the rotor.

If the term Kdo·δω in the expression (4) is greater than the fixed value K, the torque is generated in the reverse direction. Therefore, the value of the factor Kdo is adjusted so as to provide a proper speed deviation suppressing effect.

If the speed deviation suppressing term Kdo·δω is unnecessary, the factor Kdo is set to Kdo=0. In this case, the second speed difference compensator 26 and the second switch element 36 are not necessary. If the vibration suppressing term Kdi·δω is also unnecessary, the first differentiator 21 and the subtracter 31 may also be obviated.

According to the current command phases θi determined from the expressions (3) and (5), a lead angle value is set so that the motor generates the maximum torque when the fixed value K is the value corresponding to an electrical angle of 90 degrees. If the fixed value K is close to the value corresponding to an electrical angle of 90 degrees, the lead angle value is set so as to generate a torque close to the maximum torque.

In the aforementioned arrangement, the lead angle value for generating a great torque according to the fixed value K is used based on the result of the determination of the polarities of the positional deviation δθ and the speed deviation δω when the rotor speed ωfb is yet to reach the speed command ωcom. In the aforementioned arrangement, a value obtained by multiplying the speed deviation δω by a factor is added to the lead angle value for generating the great torque, based on the polarity determination result when the rotor speed ωfb exceeds the speed command ωcom. Since the speed deviation δω and the positional deviation δθ have opposite polarities, the lead angle value is reduced by the addition.

Not only the proportional function (linear function) of the rotor speed ωfb but also a quadratic function or a cubic function of the rotor speed ωfb may be used for a lead angle correction value (Kv·ffb in the aforementioned example). Where these functions are each represented as a function F(ωfb), the expressions (2) to (6) can be reformulated into the following expressions (7) to (11).

Area E: $-K+F(\omega fb) < \delta\theta < +K+F(\omega fb)$ $$\theta i = \theta com + Kdi \cdot \delta\omega \quad (7)$$

Area A: $\delta\theta > +K+F(\omega fb),\ \delta\theta > 0,\ \delta\omega > 0$ $$\theta i = \theta fb + K + F(\omega fb) \quad (8)$$

Area B: $\delta\theta > +K+F(\omega fb),\ \delta\theta > 0,\ \delta\omega < 0$ $$\theta i = \theta fb + K + F(\omega fb) + Kdo \cdot \delta\omega \quad (9)$$

Area C: $\delta\theta < -K+F(\omega fb),\ \delta\theta < 0,\ \delta\omega < 0$ $$\theta i = \theta fb - K + F(\omega fb) \quad (10)$$

Area D: $\delta\theta < -K+F(\omega fb),\ \delta\theta < 0,\ \delta\omega > 0$ $$\theta i = \theta fb - K + F(\omega fb) + Kdo \cdot \delta\omega \quad (11)$$

FIG. 8 shows angle-torque characteristics ω-T characteristics) of the stepping motor 2 observed when the ordinary open loop control is performed and when the stepping motor 2 is controlled according to the expressions (1) to (6). Here, description will be given to an exemplary case in which K=90 degrees and the speed compensation is obviated with the proportional constant Kv for the speed compensation being set to zero.

In the ordinary open loop control, the stepping motor 2 generates the maximum torque at a position offset by an electrical angle of 90 degrees from the excitation stable point and, when an unstable point corresponding to an electrical angle of 180 degrees is exceeded, the stepping-out occurs with the torque generation direction changed.

Where the expressions (1) to (6) are employed, an electrical angle range of −90 degrees to +90 degrees (−0.9 degrees to +0.9 degrees) corresponds to the area E (−K≤δθ≤K). Therefore, the open loop control is performed, so that the torque is changed according to the electrical angle of the rotor. On the other hand, where the electrical angle is in a range less than −90 degrees or in a range greater than +90 degrees, i.e., where δθ<−K or +K<δθ, the current command phase θi is determined based on the rotor position θfb by the closed loop control (feed-back control). Therefore, the maximum torque is generated irrespective of the electrical angle of the rotor, i.e., irrespective of the positional deviation δθ.

Therefore, if the command position is set so that the absolute value of the positional deviation δθ exceeds K irrespective of the rotor position, the control is performed in the closed loop areas. That is, the closed loop control can be performed so that the maximum torque is generated by excitation at a position offset by an electrical angle of +K or −K from the rotor position. Thus, the excitation position of the stepping motor 2 can be substantially continuously changed so as to generate the maximum torque irrespective of the rotor position. This is also true when the speed compensation is performed with the proportional constant Kv set to a non-zero value.

If the fixed value K is set to a value corresponding to an electrical angle of less than 90 degrees, it is impossible to generate the maximum torque by the closed loop control. However, a torque close to the maximum torque can be generated irrespective of the rotor position by setting the fixed value K close to the value corresponding to an electrical angle of 90 degrees.

In this embodiment, the control device 1 includes a plurality of operation modes, which include the adjustment mode and the use mode. The adjustment mode is used for finding and setting a position command profile for the quickest movement and positioning. The use mode is used for operating the stepping motor 2 based on the position command profile (use mode profile) set in the adjustment mode and stored in the memory 12.

In the adjustment mode, the stepping motor 2 is controlled according to the expressions (7) to (11). More specifically, the position command profile is found, which ensures substantially the quickest movement to the target position by the acceleration with substantially the maximum torque and the deceleration with substantially the maximum torque with the use of the closed loop control areas A to D, and ensures the quickest positioning by maintaining the rotor at the target position by the open loop control with the use of the area E.

However, the vibration suppressing term Kdi·δω in the expression (7) is unnecessary in this embodiment and, therefore, the factor Kdi is set to Kdi=0. Thus, the current command phase θi is θi=θcom in the area E.

In the expressions (9) and (11), the speed deviation suppressing term Kdo·δω suppresses the torque deviation to suppress the expansion of the speed deviation δω for the control. In this embodiment in which it is desirable to constantly substantially maximize the torque in the acceleration and in the deceleration, however, the speed deviation suppressing term is unnecessary and, therefore, is not used by setting the factor Kdo to Kdo=0.

Therefore, the expressions (7) to (11) are reformulated into the following expressions (7a) to (11a) for use. The expressions (8) and (9) are reformulated into the same expression (8a), (9a), and the expressions (10) and (11) are reformulated into the same expression (10a), (11a). Thus, the control is performed irrespective of the speed deviation δω.

Area E: $-K+F(\omega fb)<\delta\theta<+K+F(\omega fb)$ $$\theta i = \theta com \qquad (7a)$$

Areas A, B: $\delta\theta > +K+F(\omega fb)$ $$\theta i = \theta fb + K + F(\omega fb) \qquad (8a),(9a)$$

Areas C, D: $\delta\theta < -K+F(\omega fb)$ $$\theta i = \theta fb - K + F(\omega fb) \qquad (10a),(11a)$$

In the adjustment mode, the fixed value K is set to a value corresponding to an electrical angle of less than 90 degrees. The fixed value K to be used in the adjustment mode is preferably a value corresponding to an electrical angle of not less than 60 degrees, more preferably an electrical angle of not less than 70 degrees. For example, the fixed value K may be a value corresponding to an electrical angle of about 80 degrees or not less than 80 degrees.

In the closed loop areas A to D, the fixed value K corresponds to a motor load angle, and the generated torque of the stepping motor 2 is represented by the following expression (12) in which Kt is a torque constant and I is a winding current. Where K=80 degrees, it is possible to generate a torque equivalent to 98.5% of the torque generated when K=90 degrees. Thus, substantially the maximum torque can be generated. Further, K=70 degrees ensures generation of a torque equivalent to 94.0% of the maximum torque, and even K=60 degrees ensures generation of a torque equivalent to 86.6% of the maximum torque. Thus, the generation of substantially the maximum torque is possible. Therefore, the torque T represented by the expression (12) is hereinafter sometimes referred to as the maximum torque for convenience.

$$T = Kt \cdot I \cdot \sin(K) \qquad (12)$$

Figure 9A:
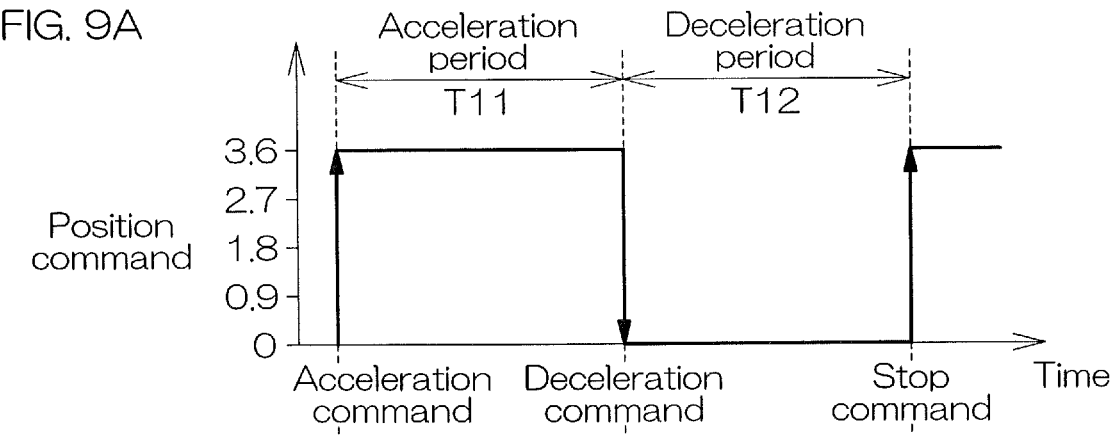
FIGS. 9A to 9D are diagrams for describing an exemplary operation in an adjustment mode.
Figure 9B:
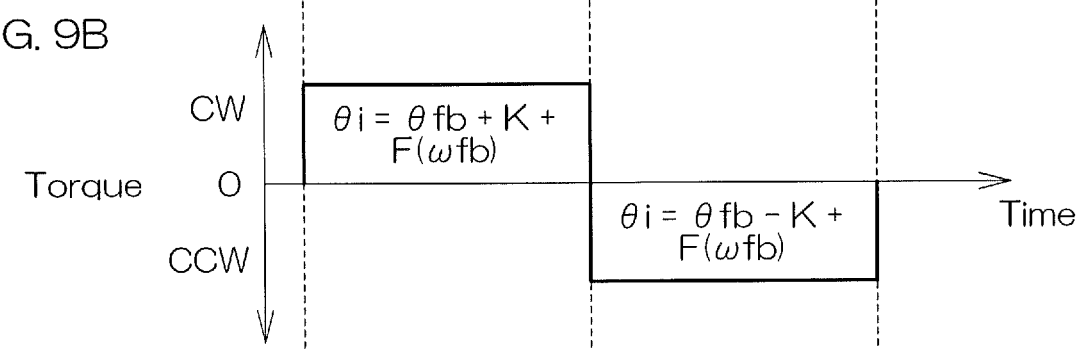
Figure 9C:
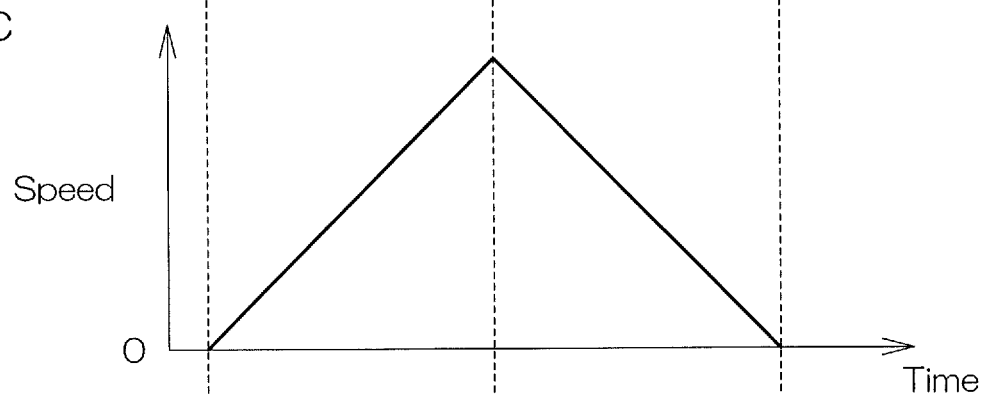

FIGS. 9A to 9D are diagrams for describing an exemplary operation in the adjustment mode. In this exemplary operation, the position command profile (adjustment mode profile) is set for the ideal operation. Similarly, FIGS. 10A to 10D are diagrams for describing another exemplary operation in the adjustment mode. In this exemplary operation, the rotor position exceeds the target position before the end of the deceleration period. Similarly, FIGS. 11A to 11D are diagrams for describing further another exemplary operation in the adjustment mode. In this exemplary operation, the deceleration period ends before the rotor position reaches the target position. FIGS. 9A, 10A and 11A each show the position command profile (adjustment mode profile), and FIGS. 9B, 10B and 11B each show a change in the generated torque with time. FIGS. 9C, 10C and 11C each show a change in the rotor speed with time, and FIGS. 9D, 10D and 11D each show a change in the rotor position with time.

The position command profile for the adjustment mode (adjustment mode profile) is preliminarily written in the memory 12 from the setting device 4. In the adjustment mode, the arithmetic unit 11 reads out the rotor position commands included in the adjustment mode profile from the memory 12, and generates the motor winding current commands Iacom, Ibcom according to the rotor position commands.

The rotor position commands of the adjustment mode profile define commands for performing a first step, a second step and a third step to be described below.

The first step is an acceleration process (acceleration operation), and a command for the first step is an acceleration command. The acceleration command may be, for example, a rotor position command θcom which commands a position shifted by +3.6 degrees (corresponding to an electrical angle of 360 degrees) from the initial position (a position before the movement) of the rotor. In this case, the positional deviation δθ is greater than the sum of the fixed value +K and a speed correction term F (ωfb) (e.g., F(ωfb) =Kv·ffb) and, therefore, the control belongs to the closed loop area A, B. Thus, the current command phase θi is θi=θfb+K+F(ωfb) according to the expression (8a), (9a), so that the stepping motor 2 generates a torque in the forward rotation direction (CW) to accelerate the rotor.

The acceleration command is defined so that the maximum torque represented by the expression (12) can be constantly generated during the first step, i.e., during the acceleration period. More specifically, the acceleration command is preferably a rotor position command which commands a position spaced from the rotor initial position by not less than three-fourths of a movement amount to the target position (by an electrical angle of not less than 270 degrees). If the rotor position reaches about one-half the movement amount to the target position, i.e., the rotor position reaches around a +1.8 degree position (corresponding to an electrical angle of 180 degrees), in one millisecond after the start of the operation, for example, the acceleration command may include the 0th to 15th rotor position commands θcom(0) to θcom(15)=+3.6 degrees (corresponding to an electrical angle of 360 degrees), because 1 millisecond/62.5 microseconds=16.

The second step is a deceleration process (deceleration operation), and a command for the second step is a deceleration command. The second step is started at the end of the first step, i.e., at the end of the acceleration period. Specifically, the second step is started when the rotor position reaches about one-half the movement amount to the target position, i.e., the rotor position reaches around the +1.8-degree position (corresponding to an electrical angle of 180 degrees). Specifically, the deceleration command may be, for example, a rotor position command θcom which commands a 0-degree position. If the deceleration command is issued in one millisecond after the start of the operation, for example, the 16th rotor position command θcom(16) is θcom(16)=0 degree (corresponding to an electrical angle of 0 degree). The positional deviation δθ is smaller than the sum of the fixed value −K and the speed correction term F(ωfb) (e.g., F(ωfb)=Kv·ffb) and, therefore, the control belongs to the closed loop area C, D. Thus, the current command phase θi is θi=θfb−K+F(ωfb) according to the expression (10a), (11a), so that the stepping motor 2 generates a torque in the reverse rotation direction (CCW) to decelerate the rotor.

The deceleration command is defined so that the maximum torque represented by the expression (12) can be constantly generated during the second step period, i.e., during the deceleration period. More specifically, the deceleration command is preferably a position command which commands a position spaced by an angle (corresponding to an electrical angle of not greater than 90 degrees) corresponding to a lag of not less than one-fourth of the movement amount to the target position (corresponding to an electrical angle of not less than 90 degrees) from the rotor position observed when the rotor is moved one-half the movement amount to the target position. If the target position is reached in one millisecond after the start of the deceleration command, for example, the deceleration command may include the 16th to 31st rotor position commands θcom(16) to θcom(31)=0 degree (corresponding to an electrical angle of 0 degree), because 1 millisecond/62.5 microseconds=16.

After the acceleration period (first step period) in which the acceleration operation is performed with the maximum torque, the deceleration operation is continuously performed with the maximum torque, whereby the rotor speed is reduced to zero at the end of the deceleration period (second step period) having a duration T12 which is substantially equal to the duration T11 of the acceleration period. In a strict sense, the duration T11 of the acceleration period is longer than the duration T12 of the deceleration period due to the influence of the frictional load.

The third step is a position holding process (position holding operation) for holding the rotor at the target position, and a command for the third step is a position holding command. The third step is started at the end of the second step, i.e., at the end of the deceleration period. At the end of the deceleration period, the rotor speed is zero and, in this state, the third step is started. More specifically, the position holding command (stop command) may be a rotor position command θcom which commands a +3.6-degree position (corresponding to an electrical angle of 360 degrees) as the target position. At this time, the positional deviation δθ is −K+F(ωfb)<δθ<+K+F(ωfb), so that the command belongs to the open loop area (area E). Therefore, the current command phase θi is θi=θcom.

Figure 9D:
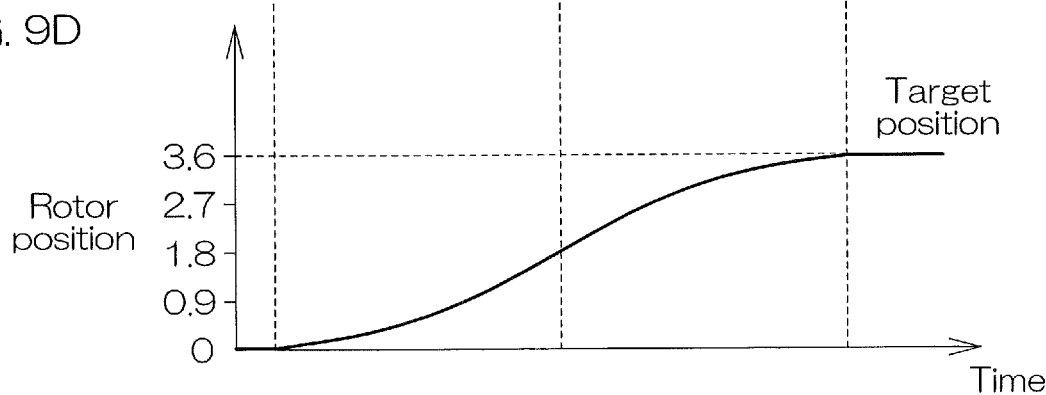
Figure 10A:
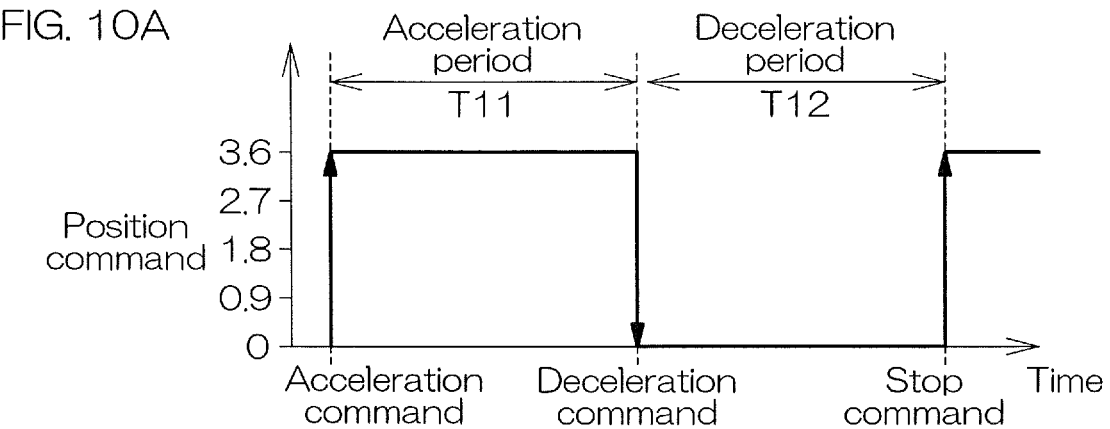
FIGS. 10A to 10D are diagrams for describing another exemplary operation in the adjustment mode.
Figure 10B:
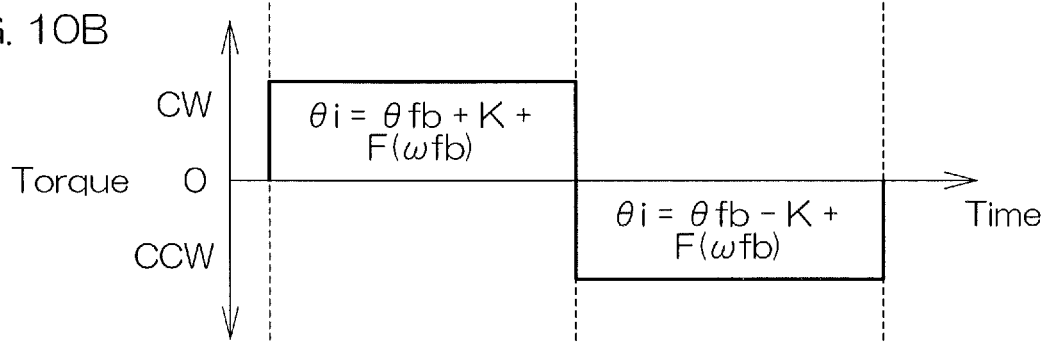
Figure 10C:
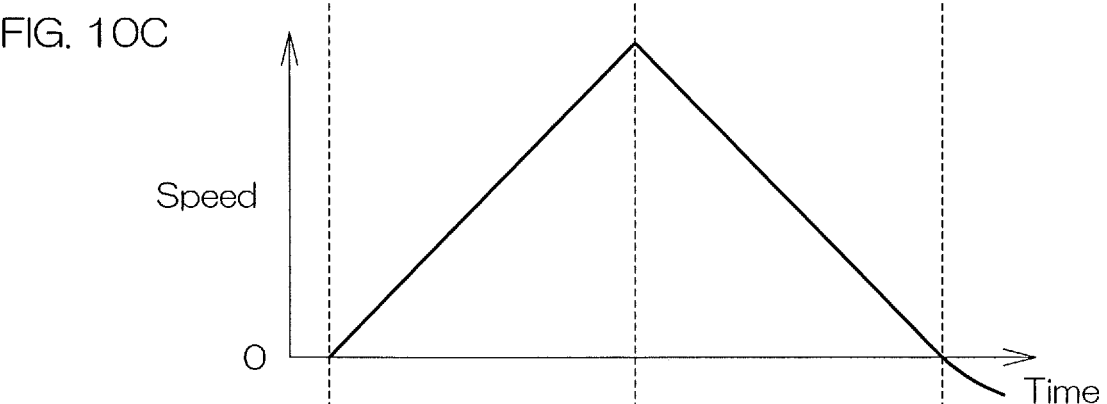

If the duration T11 of the acceleration period and the duration T12 of the deceleration period are appropriate, i.e., if the duration T11 of the acceleration period is appropriate and the timing of the switching from the acceleration command to the deceleration command is appropriate in practice, the response of the stepping motor 2 is as shown in FIGS. 9C and 9D. In this case, the rotor speed is zero when the rotor reaches the +3.6-degree position as the target position and, in this state, the excitation is caused at the +3.6-degree position. Therefore, the rotor stops at the target position substantially without the oscillation.

Figure 10D:
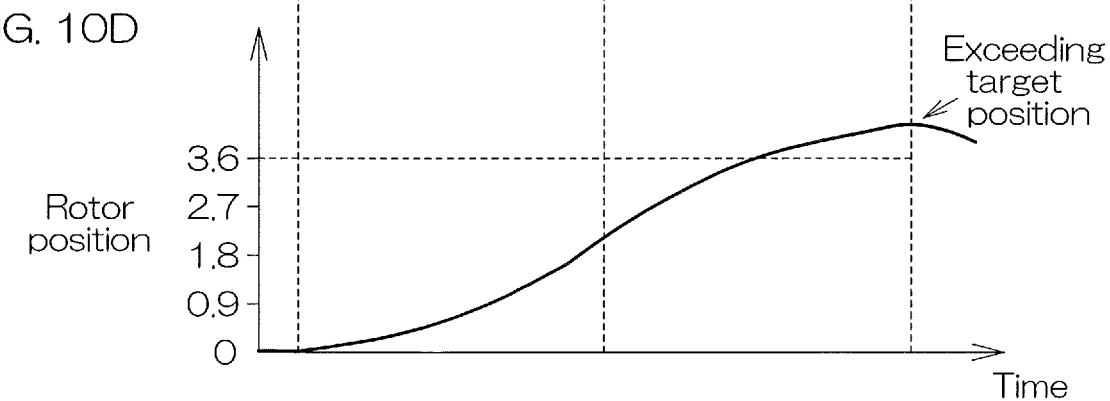
Figure 11A:
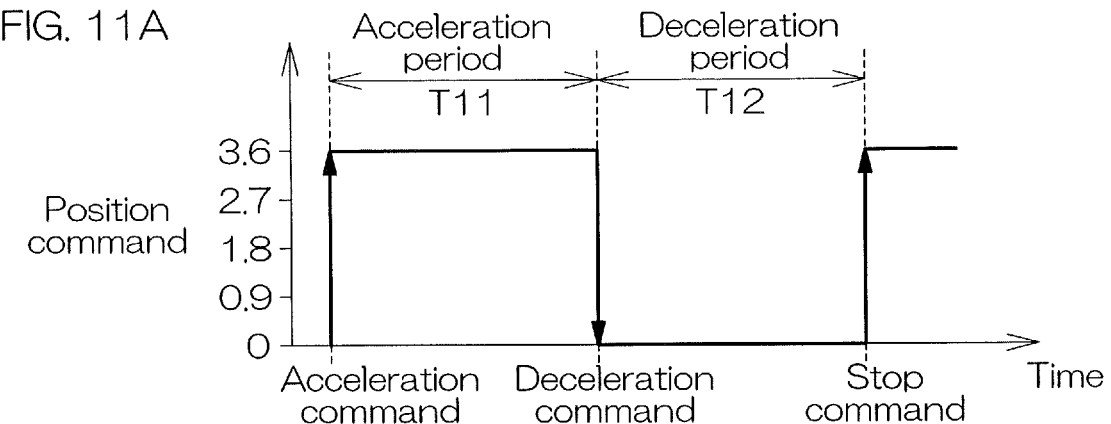
FIGS. 11A to 11D are diagrams for describing further another exemplary operation in the adjustment mode.
Figure 11B:
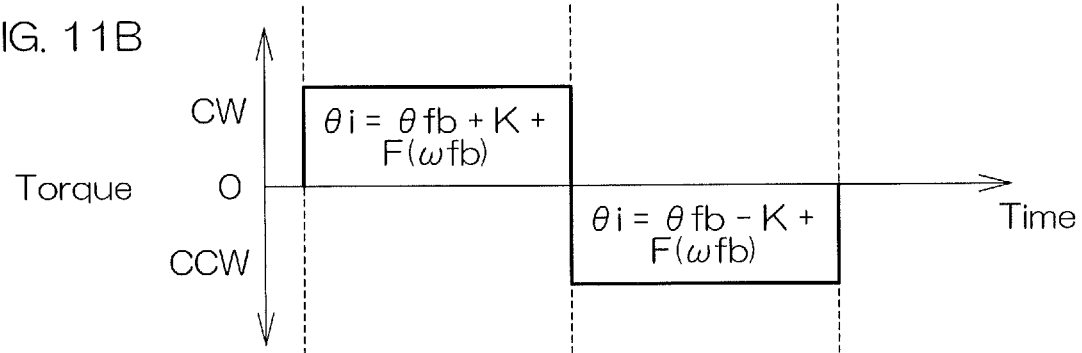
Figure 11C:
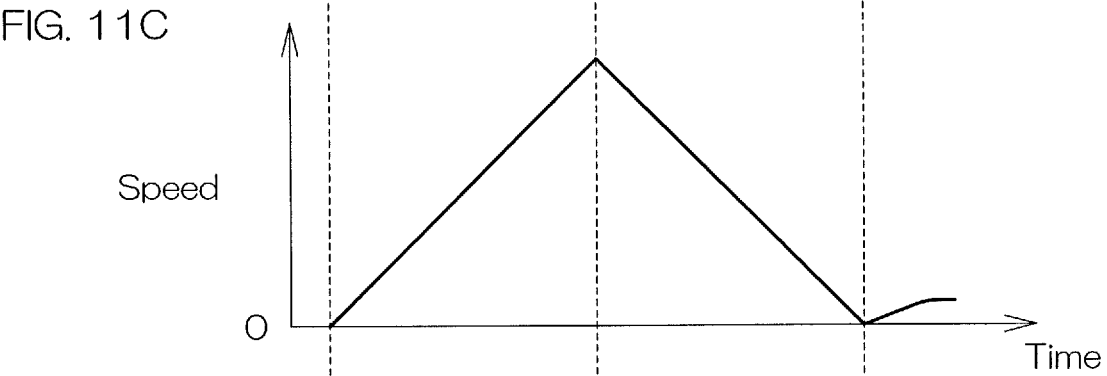

If the duration T11 of the acceleration period is too long and the timing of the switching from the acceleration command to the deceleration command is late, the response of the stepping motor 2 is as shown in FIGS. 10C and 10D. That is, the rotor speed is positive even after the rotor passes over the +3.6-degree position as the target position, and the rotor speed is reduced to zero after the rotor passes over the target position. If the position holding command (stop command) for holding the rotor at the +3.6-degree position is inputted at this time, the rotor is returned to the target position from the pass-over position. Thereafter, the rotor is oscillated about the target position, and the positioning is completed after the oscillation is converged.

Figure 11D:
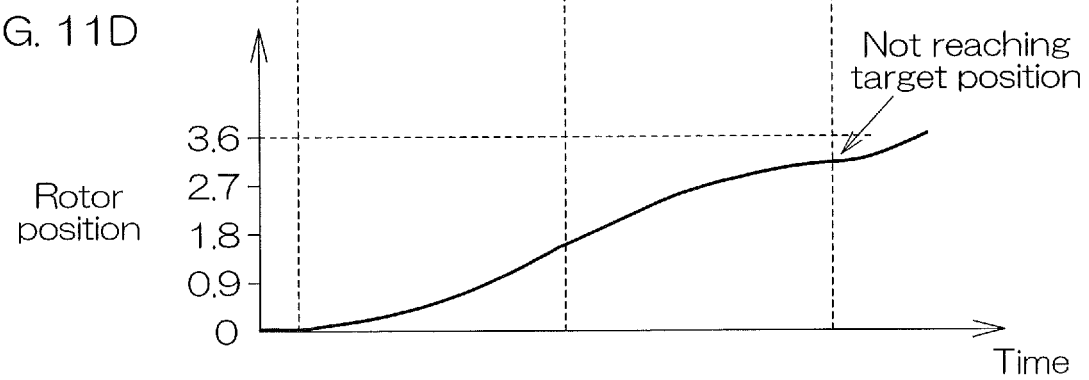

If the duration T11 of the acceleration period is too short and the timing of the switching from the acceleration command to the deceleration command is early, the response of the stepping motor 2 is as shown in FIGS. 11C and 11D. That is, the rotor speed is reduced to zero before the rotor reaches the +3.6-degree position as the target position. If the position holding command (stop command) for holding the rotor at the +3.6-degree position is inputted at this time, the rotor is accelerated again toward the target position from before the target position. Thereafter, the rotor is oscillated about the target position, and the positioning is completed after the oscillation is converged.

The adjustment mode can be started by connecting the setting device 4 to the interface 14 and inputting a mode command from the setting device 4 to the control device 1. In the adjustment mode, the adjustment can be manually or automatically performed.

The manual adjustment is performed in the following manner.

An operator operates the input device 5 of the setting device 4 to write an adjustment mode profile (see FIGS. 9A, 10A and 11A) in the memory 12, and then gives a command to the control device 1 for a positioning trial operation in the adjustment mode. Specifically, the adjustment mode profile is an array variable θcom(n) representing rotor position commands in time sequence.

The control device 1 performs the positioning trial operation including the first step, the second step and the third step according to the adjustment mode profile written in the memory 12.

In the positioning trial operation, rotor positions θfb detected by the rotor position detector 3 are inputted to the setting device 4 via the interface 14. Further, rotor speeds ωfb obtained by differentiating the rotor positions θfb by the arithmetic unit 11 are also inputted to the setting device 4 via the interface 14. The setting device 4 displays the inputted rotor positions θfb and the inputted rotor speeds ωfb on a screen of the display device 7 (e.g., in a graph form) (see FIGS. 9C, 10C, 11C; and FIGS. 9D, 10D, 11D).

When the positioning trial operation is performed, the arithmetic unit 11 computes current command phases θi in the respective control cycles, and subjects the current command phases θi to coordinate conversion to generate motor winding current commands Iacom, Ibcom (see FIG. 6). The current command phases θi generated in the respective control cycles in time sequence are stored as an array variable θi(n) in time sequence in the memory 12. The array variable θi (n) of the current command phases θi may be stored in the memory 12 and/or inputted to the setting device 4 via the interface 14 and stored in the storage device 9 within the setting device 4.

The operator checks time-related changes in the rotor position θfb and the rotor speed ωfb displayed on the display device 7 of the setting device 4 (i.e., the response of the stepping motor 2), and determines whether the duration T11 of the acceleration period and the duration T12 of the deceleration period are appropriate. More specifically, if the duration T11 of the acceleration period is too long, i.e., if the timing of the switching from the acceleration to the deceleration is late (see FIGS. 10A to 10D), the adjustment mode profile in the memory 12 is modified so as to reduce the duration T11 of the acceleration period to hasten the timing of the switching from the acceleration to the deceleration. If the duration T11 of the acceleration period is too short, i.e., if the timing of the switching from the acceleration to the deceleration is early (see FIGS. 11A to 11D), in contrast, the adjustment mode profile in the memory 12 is modified so as to increase the duration T11 of the acceleration period to delay the timing of the switching from the acceleration to the deceleration. Of course, the duration T12 of the deceleration period is also changed according to a change in the duration T11 of the acceleration period.

When the adjustment mode profile in the memory 12 is modified, the data in the memory 12 may be directly edited via the interface 14. Further, the adjustment mode profile stored in the storage device 9 of the setting device 4 may be edited, and the edited adjustment mode profile may be written in the memory 12 via the interface 14. Of course, a plurality of different adjustment mode profiles may be prepared, and the adjustment mode profile to be used in the adjustment mode may be switched among these adjustment mode profiles. In this case, the adjustment mode profiles may be preliminarily stored in the memory 12, or may be stored in the storage device 9 of the setting device 4.

When a state such that the rotor reaches the target position at a speed of zero (see FIGS. 9A to 9D) is provided by thus properly adjusting the durations T11 and T12 of the acceleration period and the deceleration period (more specifically, the timing of the switching from the acceleration to the deceleration), the adjustment is completed. The current command phases $\theta i$ acquired in the properly adjusted state are hereinafter referred to as "current command phases $\theta i^*$" for discrimination. An array variable $\theta i^*(n)$ of the current command phases $\theta i^*$ acquired in the properly adjusted state is used as an array variable $\theta com(n)=\theta i^*(n)$ of the rotor position commands representing the position command profile (the use mode profile) to be used in the use mode.

When the array variable $\theta i(n)$ of the current command phases $\theta i$ generated in the adjustment mode is stored in the memory 12, an array variable $\theta i^*(n)$ provided at the end of the adjustment mode is regarded as the array variable $\theta com(n)$ (use mode profile) of the rotor position commands. When the array variable $\theta i(n)$ of the current command phases $\theta i$ generated in the adjustment mode is not stored in the memory 12 but saved in the storage device 9 of the setting device 4, the operator writes the array variable $\theta i^*(n)$ of the current command phases $\theta i^*$ acquired in the properly adjusted state as the use mode profile (the array variable $\theta com(n)$ of the rotor position commands for the use mode) in the memory 12 via the interface 14.

Then, the operator operates the input device 5 to set the operation mode of the control device 1 to the use mode, and completes the adjustment. Thereafter, the setting device 4 may be disconnected from the interface 14.

The use mode profile represented by the array variable $\theta i^*(n)$ of the properly adjusted current command phases $\theta i^*$ is a profile represented by a line L12 in FIG. 4B.

Figure 12:
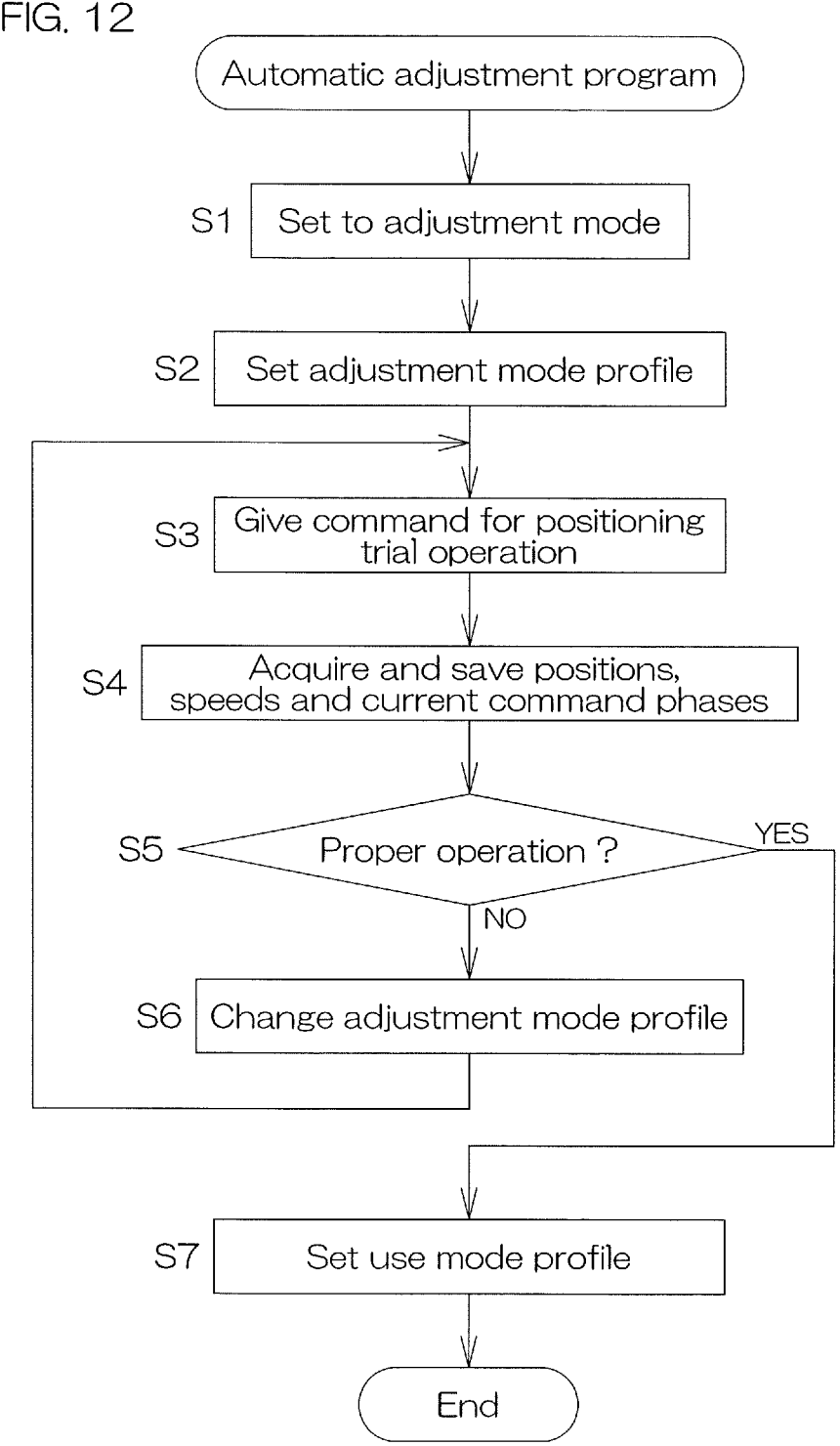
FIG. 12 is a diagram for describing an exemplary automatic adjustment process.

A program for automatically performing the aforementioned adjustment may be incorporated in the setting device 4. An exemplary operation of the automatic adjustment program is shown in FIG. 12.

When the operator operates the input device 5 to command the automatic adjustment, the processor 8 sets the operation mode of the control device 1 to the adjustment mode (Step S1). Further, the processor 8 reads out the adjustment mode profile from the storage device 9, and writes the adjustment mode profile in the memory 12 of the control device 1 via the interface 14 (Step S2). If the adjustment mode profile is preliminarily stored in the memory 12 of the control device 1, this step may be obviated.

Next, the processor 8 gives the command for the positioning trial operation to the control device 1 (Step S3). In response to this, the arithmetic unit 11 reads out the adjustment mode profile from the memory 12, and performs the positioning trial operation. The arithmetic unit 11 sends data of rotor positions $\theta fb$, rotor speeds $\omega fb$ and current command phases $\theta i$ generated in respective control cycles during the positioning trial operation to the setting device 4 via the interface 14. The processor 8 receives the data, and stores the data in time sequence in the storage device 9 (Step S4). However, as described above, the time sequence data of the current command phases $\theta i$ may be stored in the memory 12 of the control device 1. In this case, there is no need to take the data of the current command phases $\theta i$ into the setting device 4.

The processor 8 determines whether the positioning operation is properly performed (Step S5). For example, the processor 8 may determine whether the absolute value of the rotor speed $\omega fb$ observed when the rotor position $\theta fb$ reaches the target position is less than a reference value. Further, the processor 8 may determine whether the rotor position $\theta fb$ observed when the rotor speed $\omega fb$ is reduced to zero falls within a reference range. More specifically, the processor 8 may determine whether the rotor position $\theta fb$ observed when the rotor speed $\omega fb$ is reduced to zero falls within a reference range ($3.55$ degrees$\leq \theta fb \leq 3.65$ degrees) which is defined as $\pm 0.05$ degrees of the target position (e.g., the 3.6-degree position).

If the processor 8 determines that the positioning operation is not properly performed (NO in Step S5), the processor 8 modifies the adjustment mode profile (Step S6). The adjustment mode profile is modified in the same manner as in the manual adjustment described above. That is, the adjustment mode profile is modified so as to increase or reduce the duration T11 of the acceleration operation and the duration T12 of the deceleration operation. Thereafter, the processor 8 performs a process sequence from Step S3 with the use of the modified adjustment mode profile. This process sequence is repeated until the positioning operation can be properly performed.

If the processor 8 determines that the positioning operation is properly performed in the positioning trial operation (YES in Step S5), the processor 8 writes an array variable $\theta i^*(n)$ of current command phases $\theta i^*$ generated in the positioning trial operation as the use mode profile (as the array variable $\theta com(n)$ of the rotor position commands for the use mode) in the memory 12 via the interface 14 (Step S7). Where the array variable $\theta i(n)$ of the current command phases $\theta i$ is stored in the memory 12 of the control device 1 in the adjustment mode, this step may be obviated.

In this manner, the setting device 4 can function as the automatic adjustment means so that the properly adjusted use mode profile can be automatically generated and stored in the memory 12. Thereafter, the control device 1 is set in the use mode, whereby the ordinary operation can be performed with the use of the use mode profile.

The automatic adjustment function, i.e., the automatic adjustment means, may be provided in the control device 1. That is, the adjustment mode of the control device 1 may include an automatic adjustment mode for performing the automatic adjustment. In other words, the program to be executed by the control device 1 may be designed to perform the adjustment in the automatic adjustment mode. A command for performing the adjustment in the automatic adjustment mode may be given from the setting device 4. Further, the control device 1 may include a command inputting device for giving the command for the automatic adjustment in the automatic adjustment mode.

FIG. 13 is a flowchart for describing an exemplary automatic adjustment operation to be performed in the automatic adjustment mode by the control device 1. The adjustment mode profile is preliminarily stored in the memory 12. If the command for the automatic adjustment in the automatic adjustment mode is given (YES in Step S11), the arithmetic unit 11 reads out the adjustment mode profile from the memory 12, and performs the positioning trial operation according to the adjustment mode profile (Step S12). In the positioning trial operation, the arithmetic unit 11 acquires a rotor position $\theta fb$ from the rotor position detector 3, and computes a rotor speed $\omega fb$ and further computes a current command phase $\theta i$. The stepping motor 2 is controlled based on the rotor position $\theta fb$, the rotor speed $\omega fb$ and the current command phase $\theta i$.

The arithmetic unit 11 stores data of rotor positions θfb, rotor speeds ωfb and current command phases θi acquired in respective control cycles in time sequence in the memory 12 (Step S13). In parallel to this operation, the arithmetic unit 11 may send the data of the rotor positions θfb, the rotor speeds ωfb and the current command phases θi acquired in the respective control cycles to the setting device 4 via the interface 14.

Upon completion of the positioning trial operation, the arithmetic unit 11 determines whether the positioning operation is properly performed (Step S14). The determination may be performed in the same manner as in Step S5 in FIG. 12.

If the arithmetic unit 11 determines that the positioning operation is not properly performed (NO in Step S14), the arithmetic unit 11 modifies the adjustment mode profile in the memory 12 (Step S15). The adjustment mode profile is modified in the same manner as in the aforementioned manual adjustment and as in Step S6 in FIG. 12. Thereafter, the arithmetic unit 11 performs a process sequence from Step S12 with the use of the modified adjustment mode profile. This process sequence is repeated until the positioning operation is properly performed.

If the arithmetic unit 11 determines that the positioning operation is properly performed in the positioning trial operation (YES in Step S14), the arithmetic unit 11 sets an array variable θi*(n) of current command phases θi* generated in the positioning trial operation and written in the memory 12 in Step S13 as the use mode profile (as the array variable θcom(n) of the rotor position commands for the use mode) (Step S16).

In this manner, the arithmetic unit 11 can function as the automatic adjustment means, so that the properly adjusted use mode profile can be automatically generated and stored in the memory 12. In the use mode, the arithmetic unit 11 can properly drive the stepping motor 2 with the use of the use mode profile stored in the memory 12.

Figure 14A:
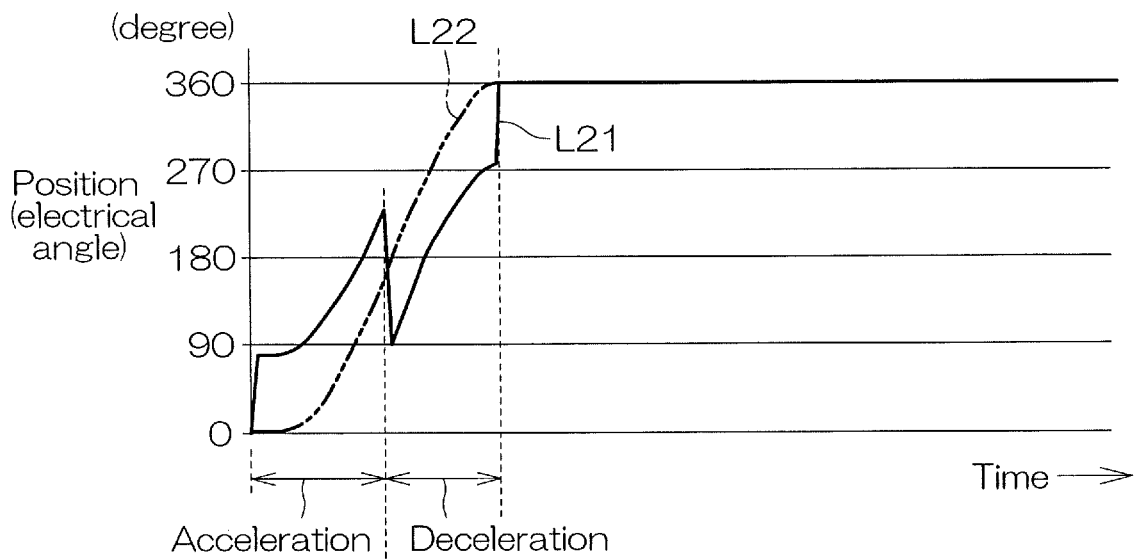
FIGS. 14A, 14B and 14C show an exemplary positioning operation in the use mode.
Figure 14B:
Figure 14C:
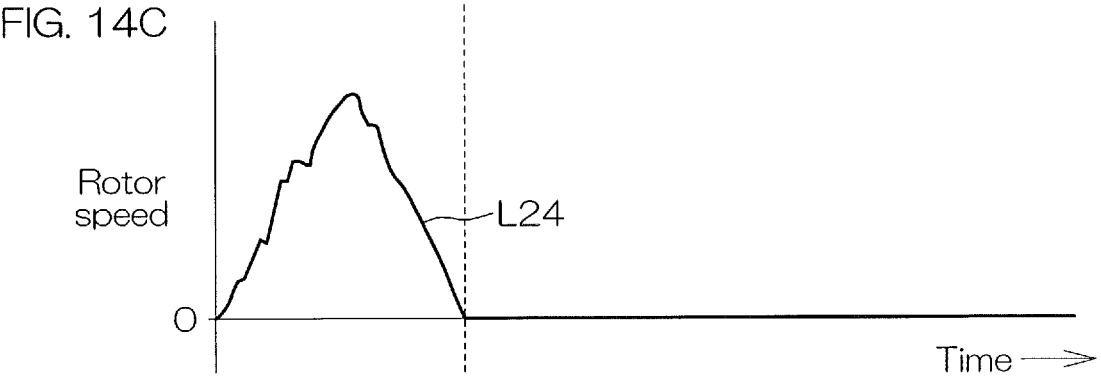

FIGS. 14A, 14B and 14C show an exemplary positioning operation in the use mode. In FIG. 14A, a line L21 indicates a change in the rotor position command θcom with time (i.e., the use mode profile), and a line L22 indicates a change in the rotor position (actual position) with time. A line L23 in FIG. 14B indicates a change in the positional deviation δθ with time, and a line L24 in FIG. 14C indicates a change in the rotor speed ωfb with time.

In the acceleration period, the rotor position command θcom (line L21) commands a position ahead of the rotor position θfb (line L22) by an angle corresponding to the fixed value K (e.g., 80 degrees) and, therefore, the positional deviation δθ (line L23) correspondingly occurs, whereby substantially the maximum acceleration torque is generated. In the deceleration period following the acceleration period, the rotor position command θcom (line L21) commands a position behind the rotor position θfb (line L22) by an angle corresponding to the fixed value K (e.g., 80 degrees) and, therefore, the positional deviation δθ (line L23) correspondingly occurs as having a negative value, whereby substantially the maximum deceleration torque is generated. Thus, the rotor speed ωfb (line L24) is changed so as to follow a triangular pattern, and is reduced to zero at the end of the deceleration period. At this time, the rotor position θfb is the target position (corresponding to an electrical angle of 360 degrees). As described above, the duration of the acceleration period is longer than the duration of the deceleration period due to the influence of the frictional load.

After the end of the deceleration period, the position command θcom is the target position (corresponding to an electrical angle of 360 degrees), and excitation is caused at the target position, whereby the rotor is held at the target position. Since the excitation is caused at the target position at the timing at which the speed is reduced to zero at the target position, the rotor is stopped and positioned at the target position substantially without the oscillation.

In the use mode, the arithmetic unit 11 reads out the array variable θcom(n) of the rotor position commands θcom (the use mode profile) stored in the memory 12, and performs the control based on the expression (7a) to (11a) according to the array variable θcom(n). In the use mode, however, the fixed value K to be used for the determination of the control area from the areas A to E preferably corresponds to an electrical angle of 90 degrees.

Since the use mode profile (i.e., the rotor position commands θcom) indicates the current command phases θi* acquired in the properly adjusted state in the adjustment mode, as described above, the absolute value of the positional deviation δθ is equal to the fixed value K (e.g., corresponding to an electrical angle of 80 degrees) used in the adjustment mode. Therefore, the control is performed based on the open loop area E and, hence, virtually by using the expression (7a) alone during the entire period. At this time, the current phase θi* in the adjustment mode coincides with the current phase θi in the use mode with θi=θcom=θi*, whereby the current observed in the adjustment is reproduced.

The fixed value K is set to a value corresponding to an electrical angle of less than 90 degrees (e.g., an electrical angle of 80 degrees) in the adjustment mode, whereby the positional deviation δθ can be reliably maintained as corresponding to an electrical angle of not greater than 90 degrees (not greater than the fixed value K for the area determination in the use mode). This makes it possible to reliably perform the operation based on the open loop area E.

If the fixed value K is set as corresponding to an electrical angle of 90 degrees in the adjustment mode, the positional deviation δθ is liable to exceed an electrical angle of 90 degrees to enter the closed loop areas when the rotor response is even slightly delayed in the use mode. In the closed loop areas, the current command phases θi are each determined based on the rotor position θfb detected by the rotor position detector 3 and, therefore, are liable to be influenced by the detection accuracy of the rotor position detector 3. If an attempt is made to perform the open loop control in the areas A to D in order to avoid the control in the closed loop areas when the fixed value K is set to K=90 degrees, the open loop control should be performed with a motor load angle of 90 degrees. Therefore, the torque is liable to decrease when the rotor is even slightly delayed. This may further increase the delay to result in the stepping-out.

Where the fixed value K is set as corresponding to an electrical angle of less than 90 degrees in the adjustment mode, in contrast, the open loop control can be performed with a load angle kept as corresponding to an electrical angle of less than 90 degrees in the use mode. That is, the control in the open loop area E can be maintained. In the open loop control, the torque is changed according to the lag and the lead of the rotor. Where the absolute value of the fixed value K is set as corresponding to an electrical angle of 80 degrees (i.e., a load angle of 80 degrees), for example, a lag of the rotor by an electrical angle of 10 degrees results in a load angle of 90 degrees to thereby increase the torque by 1.5%. Further, a lead of the rotor by an electrical angle of 10 degrees results in a load angle of 70 degrees to thereby reduce the torque by 4.6%. Therefore, the torque increase and the torque reduction serve to reduce the lag and the lead of the rotor. This improves the robustness against the external disturbance.

According to this embodiment, as described above, the control device 1 controls the stepping motor 2 by the micro-step driving, so that the acceleration operation and the deceleration operation can be performed by constantly using substantially the maximum torque (the maximum torque or a torque close to the maximum torque). Thus, the control device 1 has a higher torque utilization efficiency. The control device 1 can operate the stepping motor 2 by the micro-step driving in the adjustment mode and in the use mode.

In the adjustment mode, the winding current of the stepping motor 2 is controlled through the closed loop control by using the detection value of the rotor position detector 3. At this time, the current command phases θi are generated as the control data for the acceleration operation and the deceleration operation by the micro-step driving. The acceleration operation and the deceleration operation are performed according to the current command phases θi. Further, the current command phases θi are stored in the memory 12 and/or in the storage device 9 of the setting device 4.

In the adjustment mode, the duration T11 of the acceleration period during which the acceleration operation is performed and the duration T12 of the deceleration period during which the deceleration operation is performed are adjusted so that the rotor is moved to the target position and the rotor speed is reduced to zero at the target position by the acceleration operation and the deceleration operation. Thus, the operation for moving the rotor to the target position can be optimized. The durations T11 and T12 of the acceleration period and the deceleration period are the only parameters to be adjusted, so that the adjustment can be relatively easily achieved. As described above, the adjustment can be manually or automatically performed. The data of the adjusted current command phases θi* (array variable θi*(n)) is used as the data of the rotor position commands θcom (array variable θcom(n) (use mode profile)) to be employed as the control data in the use mode.

The current command phases θi generated in the adjustment mode include a command for the position holding control to be performed to control the winding current of the stepping motor 2 so that the target position coincides with the excitation stable point after the deceleration operation. Therefore, the use mode profile is prepared with the use of the data of the adjusted current command phases θi* (array variable θi*(n)), whereby the use mode profile also includes the rotor position commands θcom (array variable θcom(n)) for the position holding control.

In the use mode, the winding current control is performed to reproduce the winding current of the stepping motor 2 observed in the adjustment mode by the open loop control according to the rotor position commands θcom of the use mode profile, whereby the acceleration operation, the deceleration operation and the position holding operation can be optimally achieved. Therefore, the rotor can be moved to the target position and positioned at the target position substantially without the oscillation by performing the acceleration operation and the deceleration operation with substantially the maximum torque. Thus, the quickest movement and positioning operation can be achieved. Without the use of the rotor position detection values in the open loop control, there is no influence of the detection accuracy of the rotor position detector 3. Therefore, as described above, there is no need to provide a high precision rotor position detector as the rotor position detector 3.

In this embodiment, as described above, the winding current phase θi of the stepping motor 2 is controlled so as to be equal to the phase θi=θfb±K+F(ωfb) obtained by adding the predetermined value ±K and the function F(ωfb) of the rotor speed ωfb to the detection value θfb of the rotor position detector 3 by the closed loop control in the adjustment mode. At this time, the absolute value of the predetermined value ±K is set to a value corresponding to an electrical angle of not less than 60 degrees (more preferably not less than 70 degrees, still more preferably not less than 80 degrees). Thus, as described above, it is possible to provide a control system which is capable of performing the acceleration operation and the deceleration operation with substantially the maximum torque, and is easy to adjust and robust against the external disturbance.

While the embodiment of the present invention has thus been described, the invention can be embodied in some other ways.

In the embodiment described above, the position control is performed for controlling the rotor position based on the input of the position command by way of example. Alternatively, any other control methods such as a speed control for controlling the rotor speed based on the input of a speed command, an acceleration control for controlling the rotor acceleration based on the input of an acceleration command, a torque control for controlling the torque to be generated (winding current) based on the input of a torque command (current command), and a voltage control for controlling a voltage to be applied to the windings based on the input of a voltage command may be used. Two or more of these control methods may be used in combination.

According to the control methods, data indicating the position command (the command phase θi in the aforementioned embodiment), data indicating the speed command (corresponding to the differential value of the command phase θi), data indicating the acceleration command (corresponding to the second-order differential value of the command phase θi), data indicating the torque command (corresponding to the motor winding current command Iacom, Ibcom), and data indicating the voltage command (the command of the voltage to be applied to the windings) may be saved in the adjustment mode. Then, the use mode profile is prepared with the use of the saved data.

In the embodiment described above, the use mode profile is prepared by using the current command phases θi* collected in a properly adjusted state in the adjustment mode as they are, but may be prepared by properly correcting the current command phases θi* as required.

Further, data of the rotor positions θfb collected in a properly adjusted state in the adjustment mode may be used as the control data for the preparation of the use mode profile. In this case, the rotor position commands θcom are determined by adding the fixed value +K to the control data during the acceleration period in the use mode. Further, the rotor position commands θcom are determined by adding the fixed value −K to the control data during the deceleration period in the use mode. Then, the open loop control may be performed by the micro-step driving with the use of these rotor position commands θcom.

While the embodiments of the present invention have been described in detail, these embodiments are merely specific examples that are illustrative of the technical principles of the present invention but not limitative of the invention. The spirit and scope of the present invention are limited only by the appended claims.

This application claims the priority benefit of Japanese Patent Application No. 2020-60887 filed on Mar. 30, 2020, the disclosure of which is entirely incorporated herein by reference.

REFERENCE SIGNS LIST

1: Control device
2: Stepping motor
3: Rotor position detector
4: Setting device
11: Arithmetic unit
12: Memory
13: Current control unit
14: Interface

The invention claimed is:

1. A stepping motor control device which controls a stepping motor including a rotor position detector by microstep driving,
the control device including a memory,
the control device comprising a plurality of operation modes including an adjustment mode and a use mode,
the control device being configured or programmed to, in the adjustment mode, generate control data for controlling a winding current of the stepping motor based on a command and a detection value of the rotor position detector so as to perform a closed loop control for a stepping motor acceleration operation and a stepping motor deceleration operation according to the control data, wherein
the command is adjusted to attain a predetermined response of the stepping motor, and
the control device is configured or programmed to save, in the memory, the control data that is generated when the predetermined response is attained,
the control device being configured or programmed to, in the use mode, perform the stepping motor acceleration operation and the stepping motor deceleration operation so that a winding current observed in the adjustment mode is reproduced by an open loop control for controlling the winding current of the stepping motor based on the control data generated and saved in the memory in the adjustment mode, thereby reproducing the predetermined response of the stepping motor.

2. A stepping motor control device which controls a stepping motor including a rotor position detector by microstep driving,
the control device comprising a plurality of operation modes including an adjustment mode and a use mode,
the control device being configured or programmed to, in the adjustment mode, generate control data for a closed loop for controlling a winding current of the stepping motor based on a detection value of the rotor position detector, and perform a stepping motor acceleration operation and a stepping motor deceleration operation according to the control data,
the control device being configured or programmed to, in the use mode, perform the stepping motor acceleration operation and the stepping motor deceleration operation so that a winding current observed in the adjustment mode is reproduced by an open loop control for controlling the winding current of the stepping motor based on the control data generated in the adjustment mode,
wherein the control data is generated, in the closed loop control in the adjustment mode, so that a winding current phase $\theta i$ of the stepping motor is equal to a phase $\theta i = \theta fb \pm K + F(\omega fb)$ obtained by adding
a predetermined value $\pm 1c$ wherein K is a constant, and has a positive sign for one of the acceleration operation and the deceleration operation and has a negative sign for the other of the acceleration operation and the deceleration operation, and
a function $F(\omega fb)$ of a rotor speed $\omega fb$ to the detection value $\theta fb$ of the rotor position detector.

3. The stepping motor control device according to claim 2, wherein an absolute value of the predetermined value $\pm K$ is a value corresponding to an electrical angle of less than 90 degrees.

4. The stepping motor control device according to claim 3, wherein the absolute value of the predetermined value $\pm K$ is a value corresponding to an electrical angle of not less than 60 degrees.

5. The stepping motor control device according to claim 2, wherein the control data indicates at least one of a rotor position, a position command, a current command, and a voltage command.

6. The stepping motor control device according to claim 2, wherein the open loop control in the use mode includes a stepping motor winding current control to be performed without the use of the detection value of the rotor position detector.

7. A stepping motor control device which controls a stepping motor including a rotor position detector by microstep driving,
the control device comprising a plurality of operation modes including an adjustment mode and a use mode,
the control device being configured or programmed to, in the adjustment mode, generate control data for a closed loop for controlling a winding current of the stepping motor based on a detection value of the rotor position detector, and perform a stepping motor acceleration operation and a stepping motor deceleration operation according to the control data,
the control device being configured or programmed to, in the use mode, perform the stepping motor acceleration operation and the stepping motor deceleration operation so that a winding current observed in the adjustment mode is reproduced by an open loop control for controlling the winding current of the stepping motor based on the control data generated in the adjustment mode,
wherein, in the adjustment mode, a duration of an acceleration period during which the acceleration operation is performed and a duration of a deceleration period during which the deceleration operation is performed are adjusted so that a rotor is moved toward a target position and the rotor speed is reduced to zero at the target position by the acceleration operation and the deceleration operation, and
wherein, in the use mode, the acceleration operation and the deceleration operation are performed based on control data resulting from the adjustment.

8. The stepping motor control device according to claim 7, further comprising automatic adjustment device which is configured or programmed to, in the adjustment mode, automatically adjust the duration of the acceleration period during which the acceleration operation is performed and the duration of the deceleration period during which the deceleration operation is performed, so that the rotor is moved toward the target position and the rotor speed is reduced to zero at the target position by the acceleration operation and the deceleration operation.

9. The stepping motor control device according to claim 7,
wherein the control data to be generated in the adjustment mode includes control data for a position holding control for controlling the winding current of the stepping motor so that the target position serves as an excitation stable point after the deceleration operation,
the control device being configured or programmed to, in the adjustment mode, perform a position holding operation for holding the rotor at the target position according to the control data,
the control device being configured or programmed to, in the use mode, perform the position holding operation for holding the rotor at the target position by reproducing the winding current of the stepping motor based on the control data generated for the position holding control in the adjustment mode after the deceleration operation.

10. The stepping motor control device according to claim 7, wherein the control data indicates at least one of a rotor position, a position command, a current command, and a voltage command.

11. The stepping motor control device according to claim 7, wherein the open loop control in the use mode includes a stepping motor winding current control to be performed without the use of the detection value of the rotor position detector.

12. The stepping motor control device according to claim 1, wherein the control data indicates at least one of a rotor position, a position command, a current command, and a voltage command.

13. The stepping motor control device according to claim 1, wherein the open loop control in the use mode includes a stepping motor winding current control to be performed without the use of the detection value of the rotor position detector.

14. A stepping motor control device which controls a stepping motor including a rotor position detector by microstep driving,
the control device comprising a plurality of operation modes including an adjustment mode and a use mode,
the control device being configured or programmed to, in the adjustment mode, generate control data for a closed loop for controlling a winding current of the stepping motor based on a detection value of the rotor position detector, and perform a stepping motor acceleration operation and a stepping motor deceleration operation according to the control data,
the control device being configured or programmed to, in the use mode, perform the stepping motor acceleration operation and the stepping motor deceleration operation so that a winding current observed in the adjustment mode is reproduced by an open loop control for controlling the winding current of the stepping motor based on the control data generated in the adjustment mode,
wherein the control data is generated, in the closed loop control in the adjustment mode, so that a winding current phase $\theta i$ of the stepping motor is equal to a phase $\theta i = \theta fb \pm K$ obtained by adding
a predetermined value $\pm K$, wherein K is a constant, and has a positive sign for one of the acceleration operation and the deceleration operation and has a negative sign for the other of the acceleration operation and the deceleration operation,
to
the detection value $\theta fb$ of the rotor position detector.

* * * * *